(12) United States Patent
Aini

(10) Patent No.: US 12,068,659 B2
(45) Date of Patent: Aug. 20, 2024

(54) DIFFUSER FOR AN ELECTRIC MOTOR

(71) Applicant: SHARKNINJA OPERATING LLC, Needham, MA (US)

(72) Inventor: Reza Aini, Amersham (GB)

(73) Assignee: SharkNinja Operating LLC, Needham, MA (US)

(*) Notice: Subject to any disclaimer, the term of this patent is extended or adjusted under 35 U.S.C. 154(b) by 508 days.

(21) Appl. No.: 17/112,482

(22) Filed: Dec. 4, 2020

(65) Prior Publication Data

US 2021/0175772 A1 Jun. 10, 2021

Related U.S. Application Data

(60) Provisional application No. 62/944,068, filed on Dec. 5, 2019.

(51) Int. Cl.
*H02K 5/20* (2006.01)
*H02K 7/08* (2006.01)
*H02K 9/06* (2006.01)

(52) U.S. Cl.
CPC ............ *H02K 5/207* (2021.01); *H02K 7/083* (2013.01); *H02K 9/06* (2013.01)

(58) Field of Classification Search
CPC ............ H02K 5/20; H02K 5/207; H02K 9/02; H02K 9/04; H02K 9/06
See application file for complete search history.

(56) References Cited

U.S. PATENT DOCUMENTS 3,378,907 A 4/1968 Dixon
3,629,925 A 12/1971 Brown, Jr. et al.
(Continued)

FOREIGN PATENT DOCUMENTS

CN 106540998 3/2017
CN 108306453 A * 7/2018
(Continued)

OTHER PUBLICATIONS

Varnhorst, Machine Translation of JP2009225657, Oct. 2009 (Year: 2009).*

(Continued)

*Primary Examiner* — Eric Johnson
(74) *Attorney, Agent, or Firm* — Grossman Tucker Perreault & Pfleger, PLLC

(57) ABSTRACT

The present disclosure is generally directed to techniques for radial alignment of motor components relative to each other to achieve a motor with a rotor bore having sub-micron end-to-end deviation. In an embodiment, a rotor bore alignment tool is disclosed herein that can be inserted between motor components, and more particularly, apertures/through holes defined by each of the motor components such as housing sections and a stator assembly. The rotor bore alignment tool includes expandable members that can be selectively transitioned to an extended position to cause each of the motor components to be radially aligned prior to securely coupling the same in a so-called "stack" to form a motor. Once the motor components are coupled together, the resulting motor includes a rotor shaft extending from end-to-end that preferably includes a sub-micron deviation of less than 10 microns, and more preferably less than or equal to 5 microns, for example.

11 Claims, 19 Drawing Sheets

(56) References Cited

U.S. PATENT DOCUMENTS

| | | | |
|---|---|---|---|
| 3,821,846 A | 7/1974 | Pleiss, Jr. et al. | |
| 4,079,512 A | 3/1978 | Lakes | |
| 4,188,712 A | 2/1980 | Burns | |
| 4,316,692 A | 2/1982 | Schwab | |
| 4,464,826 A | 8/1984 | Bair | |
| 4,559,698 A | 12/1985 | Bair et al. | |
| 4,574,460 A | 3/1986 | Bair | |
| 5,015,155 A | 5/1991 | Brown | |
| 5,047,745 A | 9/1991 | Marriott et al. | |
| 5,062,200 A | 11/1991 | Lanfranco | |
| 5,918,359 A | 7/1999 | Neuenschwander | |
| 6,006,417 A | 12/1999 | Brown, Jr. et al. | |
| 6,523,247 B2 | 2/2003 | Mirpuri et al. | |
| 8,151,447 B2 | 4/2012 | Neet et al. | |
| 8,875,385 B2 | 11/2014 | Hladnik et al. | |
| 9,172,289 B2 | 10/2015 | Kreidler et al. | |
| 9,641,029 B2 | 5/2017 | Kreidler et al. | |
| 9,698,645 B2 | 7/2017 | Kreidler et al. | |
| 11,418,095 B2 | 8/2022 | An et al. | |
| 2001/0017501 A1 | 8/2001 | Suzuki et al. | |
| 2002/0150446 A1 | 10/2002 | Lenard et al. | |
| 2003/0160532 A1 | 8/2003 | Suzuki et al. | |
| 2006/0181168 A1 | 8/2006 | Hargraves et al. | |
| 2006/0219231 A1 | 10/2006 | Uchida et al. | |
| 2008/0258668 A1 | 10/2008 | Oguri et al. | |
| 2012/0186036 A1* | 7/2012 | Kegg | A47L 5/22 415/191 |
| 2013/0278086 A1 | 10/2013 | Furlan et al. | |
| 2014/0338948 A1* | 11/2014 | Hester | B25F 5/02 173/171 |
| 2014/0353424 A1 | 12/2014 | Ratner | |
| 2017/0047811 A1 | 2/2017 | Konishi | |
| 2017/0085159 A1 | 3/2017 | Sauer et al. | |
| 2018/0185594 A1 | 7/2018 | Sears et al. | |
| 2022/0060087 A1* | 2/2022 | Yan | H02K 7/08 |

FOREIGN PATENT DOCUMENTS

| | | | |
|---|---|---|---|
| EP | 1686676 | 8/2006 | |
| JP | S54157224 | 11/1979 | |
| JP | H0217952 | 2/1990 | |
| JP | H0260443 | 2/1990 | |
| JP | 2005307985 A | * 11/2005 | |
| JP | 2009225657 A | * 10/2009 | F04D 29/281 |
| JP | 2010281231 A | * 12/2010 | |
| JP | 2019054712 | 4/2019 | |
| WO | 2019038921 | 2/2019 | |

OTHER PUBLICATIONS

Yu, Machine Translation of CN108306453, Jul. 2018 (Year: 2018).*
Murakami, Machine Translation of JP2010281231, Dec. 2010 (Year: 2010).*
Hirose, Machine Translation of JP2005307985, Nov. 2005 (Year: 2005).*
PCT Search Report and Written Opinion, mailed Apr. 8, 2021, received in corresponding PCT Application No. PCT/US20/63361, 12 pages.
Canadian Office Action issued Jul. 7, 2023, received in Canadian Patent Application No. 3,160,923, 4 pages.
Japanese Notice of Reasons for Refusal with machine-generated English translation issued Oct. 3, 2023, received in Japanese Patent Application No. 2022-534205, 6 pages.
Extended European Search Report issued Nov. 29, 2023, received in European Patent Application No. 20895468.5, 13 pages.
Canadian Office Action issued Mar. 8, 2024, received in Canadian Patent Application No. 3,160,923, 8 pages.

* cited by examiner

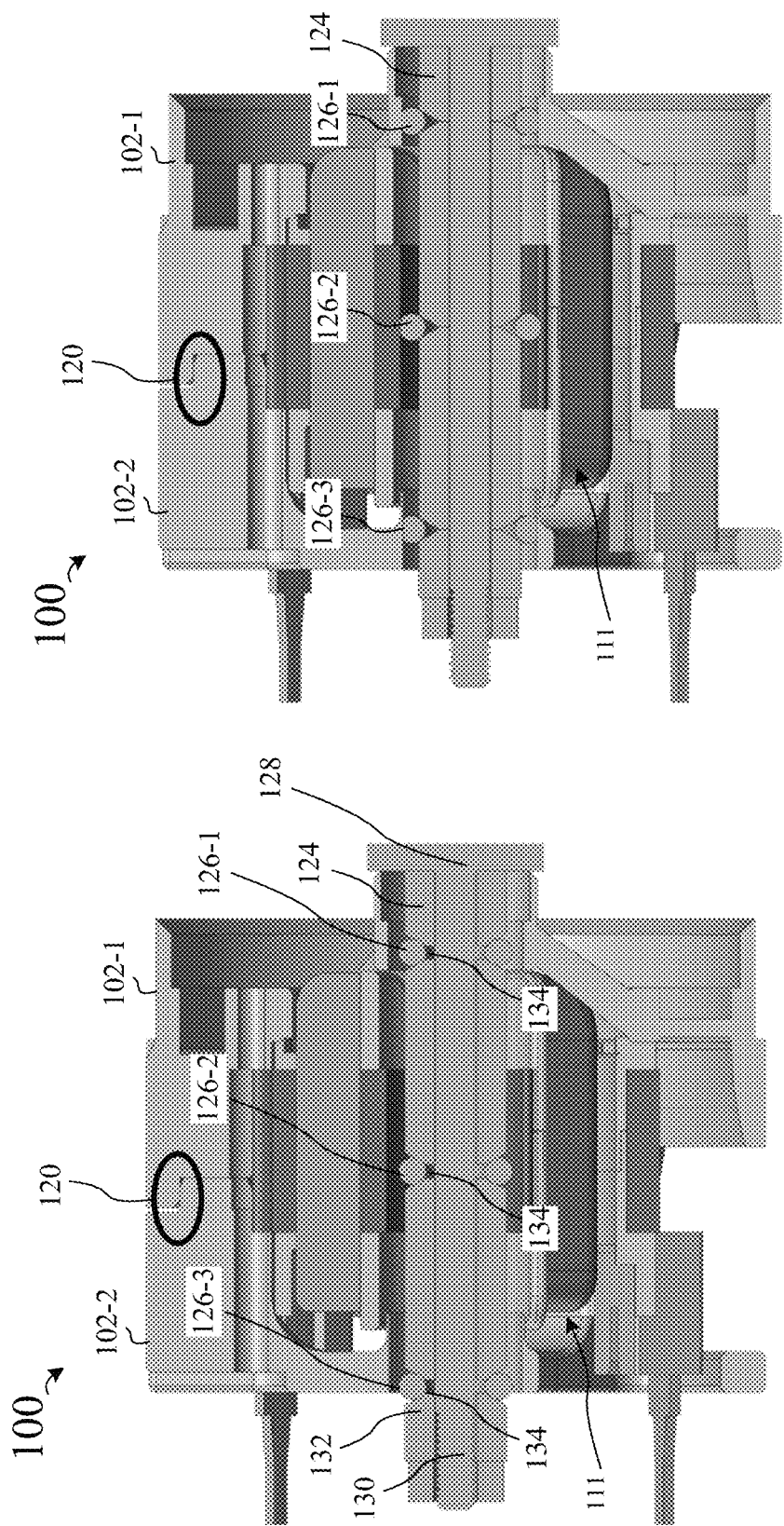

DIFFUSER FOR AN ELECTRIC MOTOR

RELATED APPLICATIONS

This application claims the benefit of U.S. Provisional Application No. 62/944,068 filed on Dec. 5, 2019, which is incorporated herein by reference in its entirety.

TECHNICAL FIELD

This specification generally relates to electric motors, and in particular, to techniques for sub-micron radial alignment of motor components, and diffuser devices for use in electric motors that divert airflow to generate one or more air jets for cooling core motor components such as windings and rotor assemblies.

BACKGROUND INFORMATION

Electric motors are used in a wide range of consumer and industrial applications. A wide variety of electric motors are available, and electric motors tend to fall into one of two broad motor types, namely brushed and brushless.

A brushed DC motor, for example, has permanent magnets on the outside of its structure and a spinning armature on the inside. The permanent magnets, which are stationary on the outside, are called the stator. The armature, which rotates and contains an electromagnet, is called the rotor. In a brushed DC motor, the rotor spins 180-degrees when an electric current is run to the armature. For sustained rotation, poles of the electromagnet must flip. As the rotor rotates, the brushes make contact with the stator, flipping the magnetic field and allowing the rotor to spin a full 360-degrees.

On the other hand, brushless DC motors do not contain brushes and use a DC current. A brushless DC motor is essentially flipped inside out, eliminating the need for brushes to flip the electromagnetic field. In brushless DC motors, for instance, the permanent magnets are on the rotor, and the electromagnets are on the stator. Circuitry can then charge the electromagnets in the stator to rotate the rotor a full 360-degrees.

In either case, radial alignment of the rotor within an electric motor significantly impacts motor performance and reliability. For instance, angular and/or radial misalignment of a rotor shaft can significantly impact nominal power/torque of a motor, introduce acoustic noise (e.g., via vibration), and ultimately lead to premature component failure based on, for instance, asymmetric loading along the associated rotor shaft.

BRIEF DESCRIPTION OF THE DRAWINGS

The drawings included herewith are for illustrating various examples of articles, methods, and apparatuses of the teaching of the present specification and are not intended to limit the scope of what is taught in any way.

FIG. 5 shows another cross-sectional view of the electric motor of FIG. 1 during a radial alignment stage of manufacturing, in accordance with an embodiment.

FIG. 6 shows another cross-sectional view of the electric motor of FIG. 1 after performing a radial alignment stage of manufacturing, in accordance with an embodiment.

DETAILED DESCRIPTION

Figure 1:
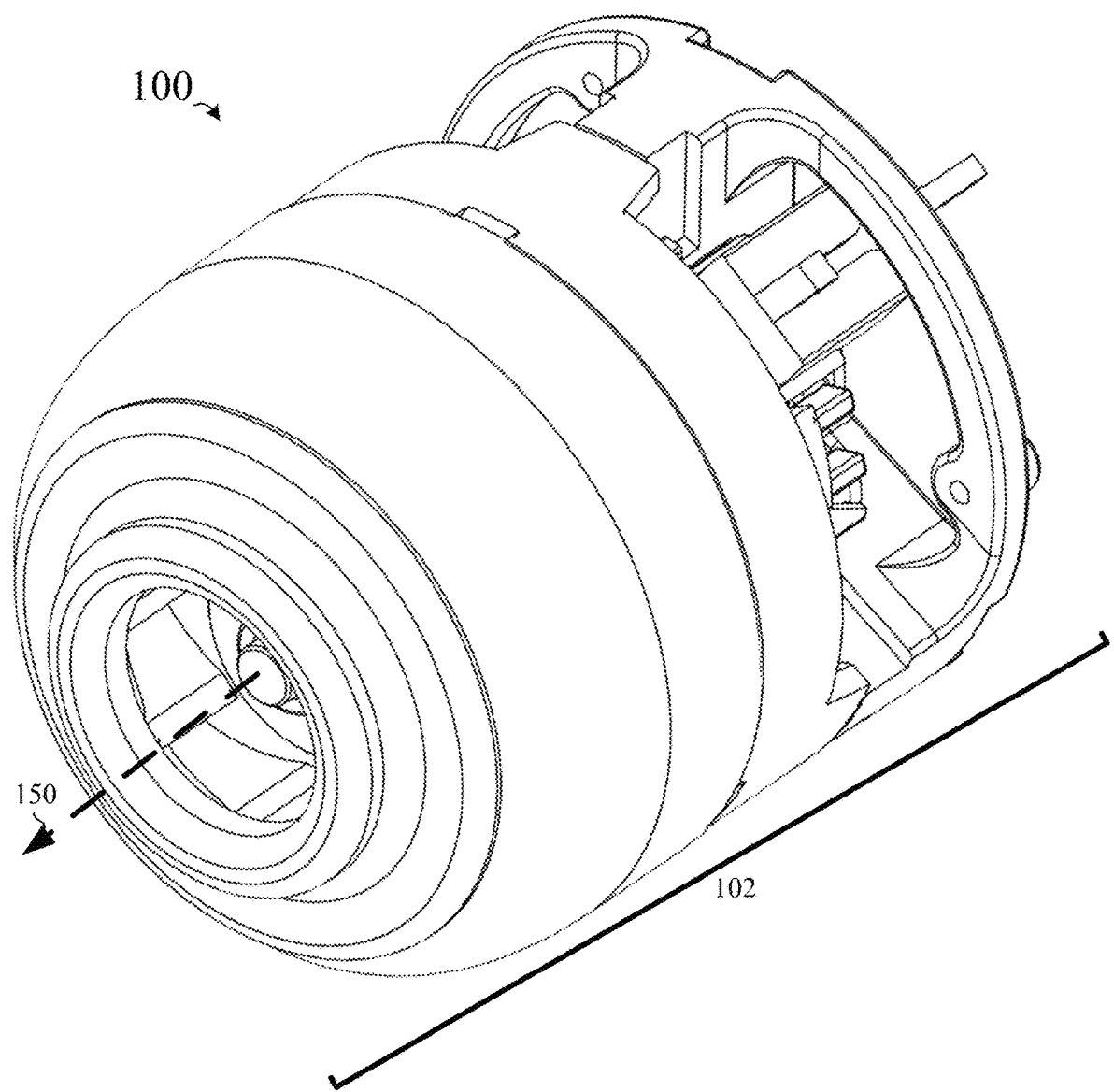
FIG. 1 shows an example electric motor in accordance with an embodiment of the present disclosure.
Figure 2:
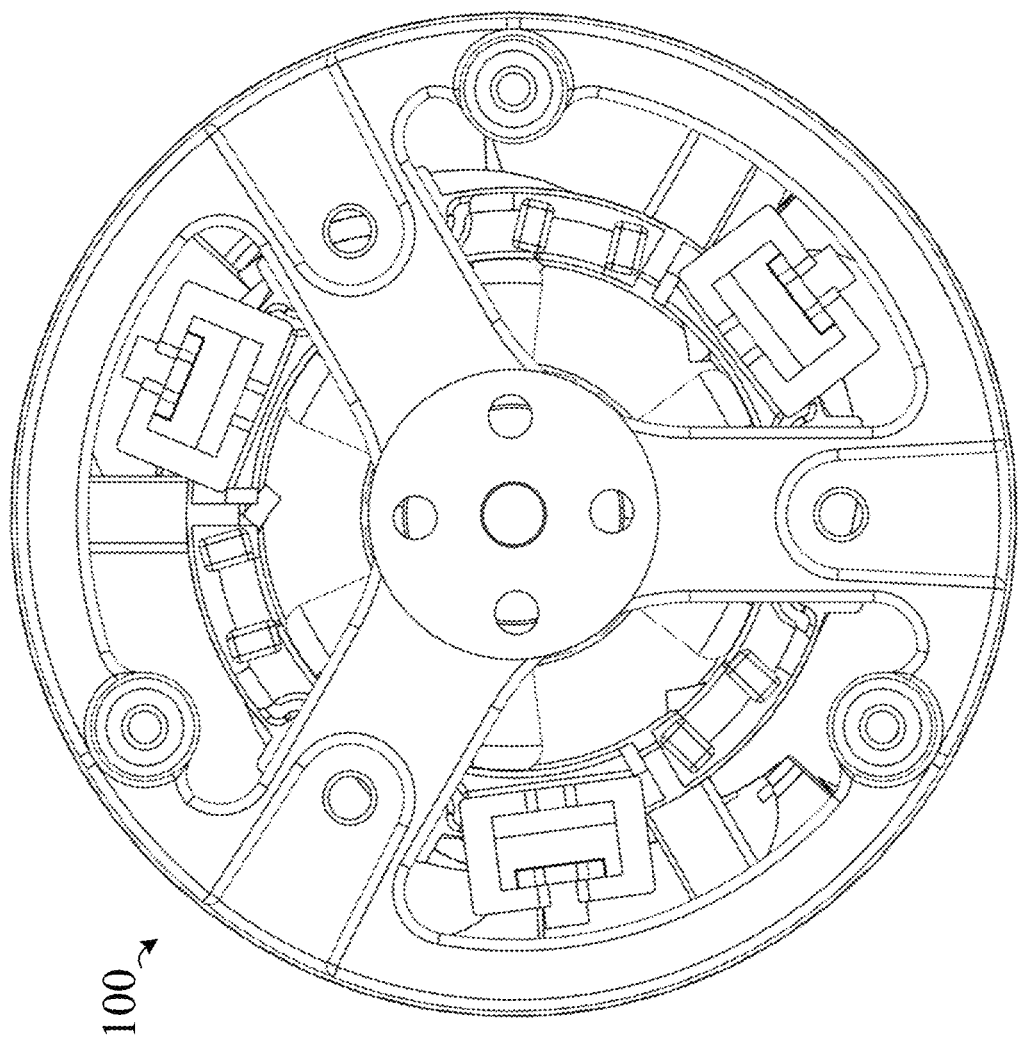
FIG. 2 shows a bottom view of the electric motor of FIG. 1 in accordance with an embodiment of the present disclosure.

As discussed above, radial alignment of the rotor shaft within an electric motor significantly impacts motor performance and reliability. Electric motors, such as brushless DC (BLDC) motors, can be formed from multiple portions/segments that get sandwiched together in a stack arrangement. For instance, some electric motors include housing portions that couple together with a stator assembly disposed therebetween. The housing portions and stator assembly can each include an aperture/through hole that align to collectively provide a rotor bore. However, as each component of the motor gets coupled together, varying amounts of deviation gets introduced. This deviation ultimately compounds as each component introduces additional misalignment such that the resulting bore has an end-to-end deviation of up to 150 microns, or worse. Ideally, the resulting bore has an end-to-end deviation of zero microns, e.g., perfectly concentric, but such a zero-micron deviation is difficult to achieve in practice. This is due to inherent manufacturing deviations in motor components, and manufacturing processes that simply cannot identify and compensate for such deviations. Minute deviations introduced by each successive motor component can ultimately compound and result in substantial radial misalignment of a rotor shaft.

Such end-to-end deviations along the rotor bore tend to proportionally introduce asymmetric loading of a rotor shaft and significantly reduce operational lifespan of a motor, e.g., due to rotor assembly wear and generated heat, as well as introduce acoustic noise due to vibrations.

Thus, the present disclosure is generally directed to techniques for radial alignment of motor components relative to each other to achieve an electric motor with a rotor bore having sub-micron end-to-end deviation, e.g., end-to-end deviation of less than 50 microns, and preferably less than 10 microns. In more detail, a rotor bore alignment tool is disclosed herein that can be inserted between multiple motor components, and more particularly, apertures/through holes defined by each of the motor components such as housing sections and a stator assembly. The rotor bore alignment tool includes expandable members that can be selectively transitioned to an extended position to cause each of the motor components to be radially aligned prior to securely coupling the same in a so-called "stack" to form a motor. Once the motor components are securely coupled together, e.g., via adhesive and/or screws, the resulting motor includes a rotor shaft extending from end-to-end that preferably includes a sub-micron deviation of less than 10 microns, and more preferably less than or equal to 5 microns, for example.

In an embodiment, an electric motor includes a first housing portion defining a first rotor receptacle to receive and couple to a first end of a rotor assembly. The electric motor further includes a second housing portion defining a second rotor receptacle to receive and couple to a second end of the rotor assembly, the first and second housing portions are configured to couple together and collectively provide a rotor bore to receive the rotor assembly. A rotor assembly is disposed within the rotor bore, with the rotor assembly comprising a shaft and first and second bearings coupled concentrically along the shaft. The first bearing can be disposed within the first rotor receptacle of the first housing portion and the second bearing can be disposed within the second rotor receptacle of the second housing portion. The shaft and associated first and second bearings are preferably radially aligned with each other based on the rotor bore collectively provided by the first and second housing portions having an end-to-end offset deviation of preferably less than 10 microns, and more preferably less than or equal to 5 microns.

Turning to the Figures, FIGS. 1-4 illustrate a motor 100 consistent with an embodiment of the present disclosure. The motor 100 is preferably configured as an electric motor, and more preferably as a brushless DC (BLDC) motor. Note, the present disclosure illustrates and describes various aspects and features with specific reference to BLDC motors. However, this disclosure is not limited in this regard, and the present disclosure is equally applicable to other electric motor types, e.g., brushed motors, with minor modification.

Figure 3:
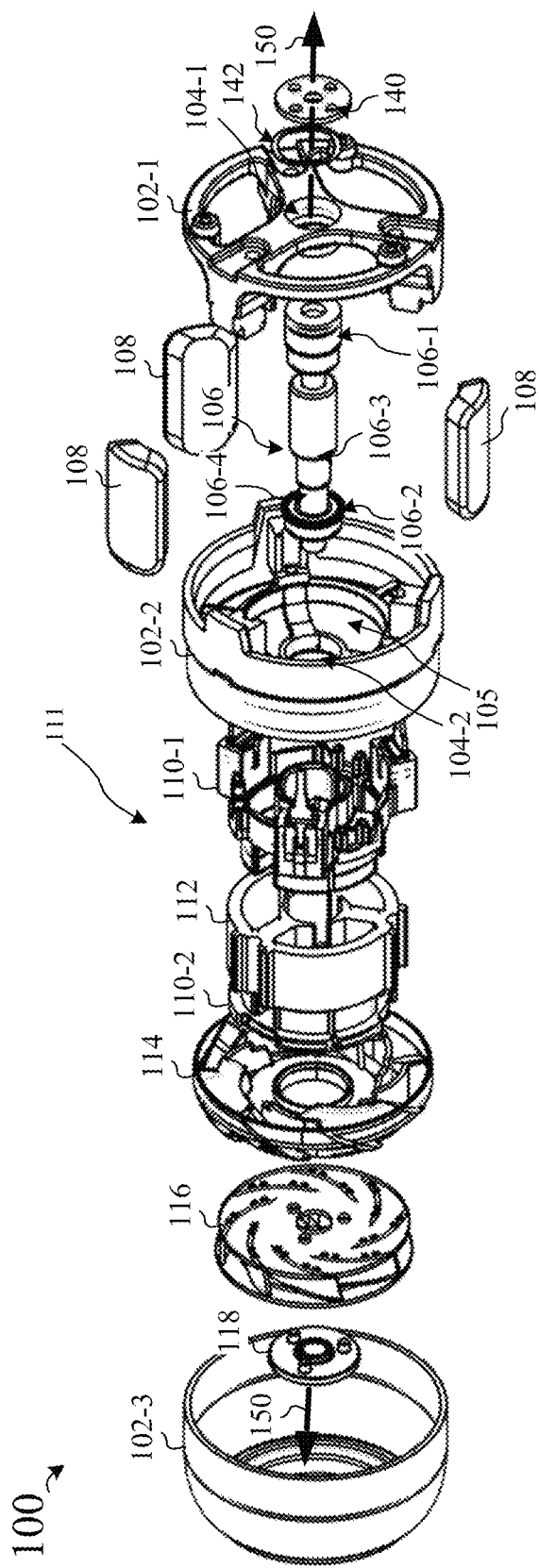
FIG. 3 shows the electric motor of FIG. 1 partially exploded in accordance with an embodiment of the present disclosure.

The motor 100 includes a housing shown collectively as 102 and individually as first, second and third housings portions 102-1, 102-2, and 102-3 respectively (See FIG. 3). The housing 102 may therefore also be referred to herein as a multi-part or multi-portion housing. The housing 102 may be formed from, for example, plastic, metal, or any other suitably ridged material. Preferably, each portion of the housing 102 comprises a thermoplastic with a relatively high heat resistance and tensile strength. For example, the housing 102 is preferably formed from Acrylonitrile butadiene styrene (ABS).

With specific reference to FIG. 3, each of the housing portions 102-1 to 102-3 are configured to radially align with each other along longitudinal axis 150 such that an aperture/through hole of each generally aligns when the same are coupled together during manufacture. As discussed further below, each of the housing portions 102-1 to 102-3 can include relatively large manufacturing tolerances to allow for relatively coarse-grain adjustment prior to subsequent radial alignment (e.g., via an extendable mandrel consistent with the present disclosure) and attachment/fixation stages.

Continuing on, the first housing portion 102-1 includes a base with a plurality of mating projections extending therefrom along the longitudinal axis 150. The mating projections are configured to interlock with corresponding mating sections of the second housing portion 102-2. Thus, the first and second housing portions may be configured to couple together via the mating projections, which may also be referred to herein as interlocking mating portions or simply interlocking portions.

The mating projections preferably include an offset alignment tolerance of up to 50 microns or more, and more preferably between 100-150 microns. The offset alignment tolerance allows for radial displacement of the first and second housing portions 102-1, 102-2 relative to each other as discussed in further detail below.

In addition, the mating projections are also preferably configured to maintain angular alignment of the first and second housing portions 102-1, 102-2. This angular alignment can be maintained by supplying a compressive force (or clamping force) along the longitudinal axis 150 that causes the first and second housing portions 102-1, 102-2, to be displaced towards each other and sandwiched together via extendable mandrels/members during manufacture, as will be discussed further below.

Continuing on, the first housing portion 102-1 further defines a first rotor receptacle 104-1 and the second housing portion 102-2 further defines a second rotor receptacle 104-2 based at least in part on the aforementioned respective apertures/through holes. The first and second housing portions 102-1, 102-2 further define a stator cavity 105, which may also be referred to herein as simply a cavity, for receiving and aligning a stator assembly, e.g., stator assembly 111, with an associated rotor assembly, e.g., rotor assembly 106.

In more detail, each of the stator components of the stator assembly 111 are radially aligned along longitudinal axis 150 and are configured to couple together in a sandwich/stack configuration. As shown in FIG. 3, the stator components of the stator assembly 111 include a first winding liner 110-1 followed by a stator stack 112 and second winding liner 110-2. The stator stack 112 can comprise a plurality of laminations. For instance, the stator stack 112 can comprise a plurality of iron laminations radially-aligned with each other.

The first and second winding liners 110-1, 110-2 are configured to receive and hold windings 108 at predefined positions relative to the stator stack 112 within the stator cavity 105 such that the windings 108 get arrayed about rotor assembly 106 within the housing 102. The windings 108 can comprise, for instance, copper or other suitable material. Thus, the stator components couple together and collectively provide a radially-aligned stator assembly disposed within the stator cavity 105.

As shown in FIG. 3, the rotor assembly is shown collectively at 106 and individually at 106-1 to 106-4. The rotor assembly 106 comprises a shaft 106-4 and a plurality of components concentrically coupled to the shaft 106-4. In particular, the rotor assembly 106 includes a first bearing 106-1, a second bearing 106-2 and a magnet 106-3, each coaxially and concentrically coupled to the shaft 106-4.

The first bearing 106-1 is disposed at a first end of the shaft 106-4 and gets at least partially inserted into the first rotor receptacle 104-1. To this end, the first bearing 106-1 may be sized/dimensioned with a diameter that is substantially identical to that of the diameter of the first rotor receptacle to ensure a "snug" fit without axial play/slop.

The second bearing 106-2 is disposed adjacent a second end of the shaft 106-4. The second bearing 106-2 gets at least partially inserted into the second rotor receptacle 104-2. The second bearing 106-2 is also sized/dimensioned such that the same couples into the second rotor receptacle 104-2 without axial play.

The magnet 106-3 is preferably fixedly coupled at a midpoint of the shaft 106-4, e.g., via an adhesive or other attachment approach, such that rotation of the shaft 106-4 causes rotation of the magnet 106-3.

As further shown, the second winding liner 110-2 is followed by a diffuser 114, a fan (or impeller) 116, a hub 118, and the third housing portion 102-3. The third housing portion 102-2 may also be referred to as a shroud.

Figure 4:
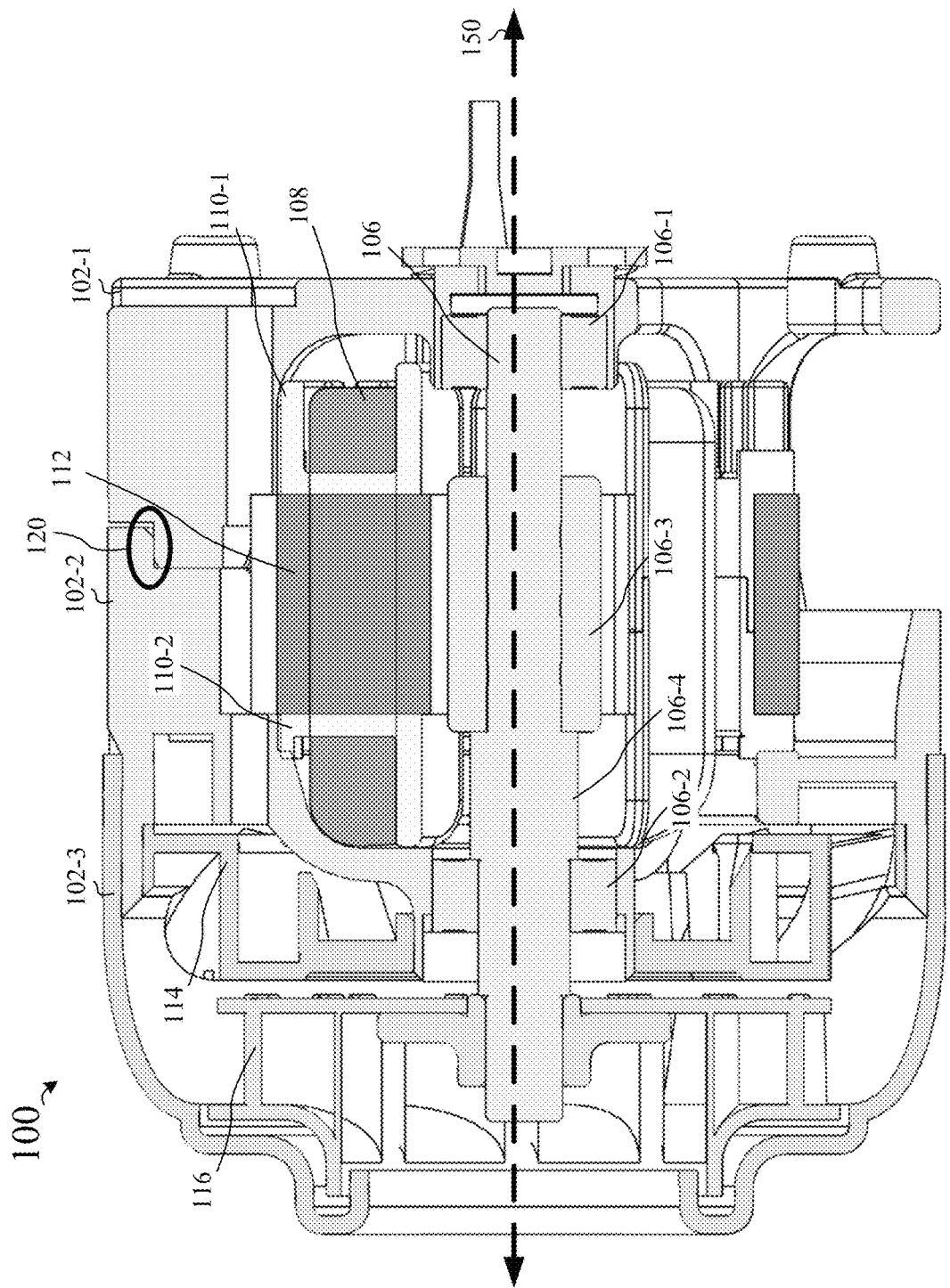
FIG. 4 shows a cross-sectional view of the electric motor of FIG. 1 in accordance with an embodiment.

Turning to FIG. 4, and with additional reference to FIG. 3, a cross-sectional view of the motor 100 is shown after components of the same have been radially aligned and securely coupled together. As shown, a shaft bore (also referred to herein a simply a bore) gets collectively formed by the apertures/through holes of each component of the motor 100 aligning along longitudinal axis 150, with the bore having a maximum nominal end-to-end offset deviation.

An end-to-end offset deviation in the context of a motor bore generally refers herein to the largest amount of radial deviation between each radially/concentrically aligned hole/aperture. For example, a radial deviation/displacement of 50 microns between the apertures/through holes of the first and second housing portions 102-1, 102-2, introduces an end-to-end offset deviation of at least 50 microns, e.g., assuming no other motor components have a greater misalignment amount.

The example bore of FIG. 4 preferably has an end-to-end offset deviation of between 10-50 microns, 10 microns+−5 microns, and more preferably less than or equal to 5 microns. Aspects and features of the present disclosure recognize that the smaller the end-to-end offset deviation is for the bore, the longer the potential operational lifespan of the motor 100. Stated differently, the closer the bore of the motor 100 gets to essentially a zero-deviation opening/bore, e.g., a perfectly concentric bore, the longer the theoretical lifespan of the motor 100 based on the shaft 106-4 of the rotor assembly 106 having symmetric loading along its length. Likewise, it is desirable to have the shaft 106-4 be disposed concentrically within the bore of the motor, e.g., without angular misalignment. This alignment is also commonly referred to as perpendicular alignment of the shaft 106-4 relative to the housing 102 of the motor.

In any event, one aspect of the present disclosure achieves sub-micron end-to-end offset deviation for the bore of the motor 100 to increase maximum motor lifespan, and reduce or otherwise mitigate motor component wear and motor acoustics caused by misaligned rotor shafts.

FIGS. 5 and 6 demonstrate one example approach for achieving the aforementioned sub-micron offset deviation for the bore of an electric motor. As shown, prior to insertion of the rotor assembly 106 into the bore of the motor 100, an extendable mandrel 124 is inserted therein, with the extendable mandrel 124 being in a retracted orientation/position. The extendable mandrel 124 may also be referred to herein as a rotor bore alignment device. The extendable mandrel 124 may be formed with an elongated shaft having a substantially uniform diameter along its entire length and an overall length greater than or equal to the length of an associated rotor bore. Preferably, the diameter of the shaft of the extendable mandrel 124 remains within +−10 microns, and more preferably less than or equal to 5 microns, along the entire length.

As shown, the extendable mandrel 124 includes a plurality of extendable members, namely first, second and third extendable members 126-1, 126-2, 126-3, respectively. The extendable mandrel 124 may include more or less extendable mandrels depending on a desired configuration. Preferably, the extendable mandrel 124 includes at least one extendable mandrel.

Each extendable member is disposed along the shaft of the extendable mandrel 124 at a predetermined position. As shown, each of the first, second and third extendable members 126-1, 126-2, 126-3, are disposed at different locations along the shaft of the extendable mandrel 124. The locations of each extendable member are preferably predefined to align with component(s) of the motor 100, and more preferably, at least the first housing portion 102-1, the second housing portion 102-2, and the stator assembly 111.

For example, and as shown in FIG. 5, the extendable mandrel 124 is preferably configured to be inserted into the bore of the motor 100 and prevented from further insertion by flange 128 of the extendable mandrel 124 engaging outer surfaces of the motor 100. Each of the first, second, and third extendable members 126-1, 126-2, and 126-3 may therefore be disposed at predetermined locations along the extendable mandrel 124 at locations that, when the extendable mandrel 124 gets disposed within the bore of the motor 100, align each extendable member with a target component of the motor 100, as discussed in greater detail below.

The extendable mandrel 124 further includes an actuating member (or arrangement) 130 and a sleeve 132. The sleeve 132 includes slidable sections that travel in a linear manner along the longitudinal axis of the extendable mandrel 124. The sleeve 132 preferably defines angled surfaces forming V-shaped grooves 134. Each V-shaped groove preferably extends radially about the shaft of the extendable mandrel 124. Each extendable member 126-1 to 126-3 is disposed within an associated V-shaped groove. The sleeve 132 may then slidably increase the width of each V-shaped groove to allow the extendable members 126-1 to 126-3 to transition into the retracted orientation such that the same extend radially from the shaft to a first distance of D1, such as shown in FIG. 5. The first distance D1 may be configured to allow for slidable insertion of the extendable mandrel 124 into the bore of the motor 100.

On the other hand, the sleeve 132 may then slidably decrease the width of each V-shaped groove, e.g., via linear movement along the shaft of the extendable mandrel 124, and as a result "pinch" and displace the extendable members to transition the same to an extended position/orientation, with the displacement of the extendable members causing the same increase in overall diameter and extend radially outwards from the shaft of the extendable mandrel 124 to a second distance D2. Preferably, the first distance D1 measures preferably between 0 and 100 microns, and more preferably less than 10 microns. In one preferred example, the overall diameter of the extendable mandrel 124 with the extendable members in the retracted orientation may then preferably measure about 9.25 mm. Preferably, the second distance D2 measures preferably between 500-800 microns, and more preferably, 500+−100 microns. In one preferred example, the overall diameter of the extendable mandrel 124 with the extendable members in the extended orientation may then preferably measure about 9.7 to 10.0 mm. In this preferred example, the outer diameter of the extendable mandrel 124 increases/decreases in a uniform manner along the entire length of the same such that the extendable members extend from the shaft of the extendable mandrel 124 at a distance that is within +−5 microns of each other when transitioning from the retracted to the extended orientations, and vice-versa.

Each extendable member 126-1 to 126-3 preferably comprises a material with an elasticity that allows for the aforementioned increase in overall diameter, and thus by extension, allows for each of the extendable members 126-1 to 126-3 to extend to the second distance D2 as a result as being displaced by an associated V-groove. Likewise, the material elasticity of the extendable members 126-1 to 126-3 preferably allows the same to return to an original state and decrease in overall diameter to the first distance D1 based on the V-grooves being increased and width, for example. Some such example materials with suitable elasticity and stiffness include, for example, Nitrile Butadiene Rubber (NBR), Carboxylated Nitrile Butadiene Rubber (XNBR), and/or Fluroelastomers (e.g. VITON™). Note, other approaches to expanding the overall diameter of the extendable mandrel 124 is within the scope of this disclosure and the provided examples are not intended to be limiting.

Continuing on, actuation of the extendable members 126-1 to 126-3 can occur based on rotation of the actuating member 130. As shown in FIG. 5, the actuating member 130 is a threaded screw/shaft that, in response to rotation of the same, causes linear displacement/movement of the sleeve 132. Thus, the actuating member 130 and sleeve 132 may also be pneumatic & hydraulic as well as a rack and pinion arrangement, with the rack and pinion arrangement configured to translate the rotational movement of the actuating member 130 to linear movement of the sleeve 132.

Thus, when the extendable mandrel 124 gets inserted into the bore of the motor 100, the extendable mandrel 124 reaches a predefined position (or alignment position) based on, for instance, the flange 128 bottoming out on sidewalls of the first housing portion 102-1. At the predefined position, the first extendable member 126-1 preferably aligns with the first housing portion 102-1, the second extendable member 126-2 preferably aligns with the stator assembly 111 and the third extendable member 126-3 preferably aligns with the second housing portion 102-2.

The first, second and third extendable members 126-1 to 126-3 may then be transitioned to an extended position based on, for example, a hydraulic component (not shown) that securely couples to the actuating member 130 and causes rotation of the same. In response, the sleeve 132 then slidably engages the extendable members, e.g., by reducing the width of each corresponding V-groove, and slidably displaces the extendable members.

In response, the first, second and third extendable members 126-1 to 126-3 increase in diameter and extend radially to the second distance D2. Preferably, each of the first, second and third extendable members 126-1 to 126-3 extend at substantially the same rate and distance in a synchronized manner based on the actuating member 130. In any event, as the first, second and third extendable members 126-1 to 126-3 transition to the extended position, a force is then applied along a direction that is substantially transverse relative to the shaft of the extendable mandrel 124, and more importantly, the bore of the motor 100. In response, each of the first housing portion 102-1, the stator assembly 111, and the second housing portion 102-2 get radially displaced by the substantially transverse force transferred by virtue of the aligned first, second and third extendable members 126-1, 126-2, 126-3 being transitioned to the extended position.

Notably, the aforementioned radial displacement is achieved at least in part by an offset alignment tolerance 120 (See FIGS. 4 and 5) that gets collectively provided by the first and second housing portions 102-1, 102-2. In particular, the interlocking sections that allow the first and second housing portions 102-1, 102-2 to couple together can be manufactured to allow for a predefined amount of radial displacement in the order of 50 to 100 microns, for example, to provide the offset alignment tolerance 120. Thus, when the extendable mandrel 124 transitions to the extended orientation, the offset alignment tolerance 120 allows for the first and second housing portions 102-1, 102-2 to be displaced along a direction that extends substantially transverse relative to the bore of the motor 100. The result of such displacement is a radial alignment of the first and second housing portions 102-1, 102-2 that achieves sub-micron radial alignment of the bore collectively formed therebetween (See e.g., FIG. 6).

Notably, the extendable members of the extendable mandrel 124 can also introduce a compressive/clamping force that causes the first and second housing portions 102-1, 102-2 to be displaced towards each other such that angular alignment of the bore of the motor 100 is achieved by ensuring that the interlocking portions of the first and second housing portions 102-1, 102-2 directly couple with each other, e.g., without a gap formed therebetween.

Subsequent to the first and second housing portions 102-1, 102-2 being brought into the aforementioned sub-micron radial alignment by the extendable mandrel 124, the first and second housing portions 102-1, 102-2 may be securely coupled to each other via an adhesive and/or locking device. For instance, an adhesive may be disposed on surfaces forming the interface between the first and second housing portions 102-1, 102-2. Alternatively, or in addition to adhesives, a bolt (e.g., a metal bolt/rod) or screw may be inserted through the first and second housing portions 102-1, 102-2. In scenarios where a screw is utilized, the screw can optionally include a self-tapping head for penetrating the housing portions.

After securely coupling the first and second housing portions 102-1, 102-2 to each other, the extendable mandrel 124 may be transitioned back to a retracted orientation, e.g., based on rotation of the actuating member 130. The extendable mandrel 124 may then be extracted from the bore of the motor 100.

Figure 7:
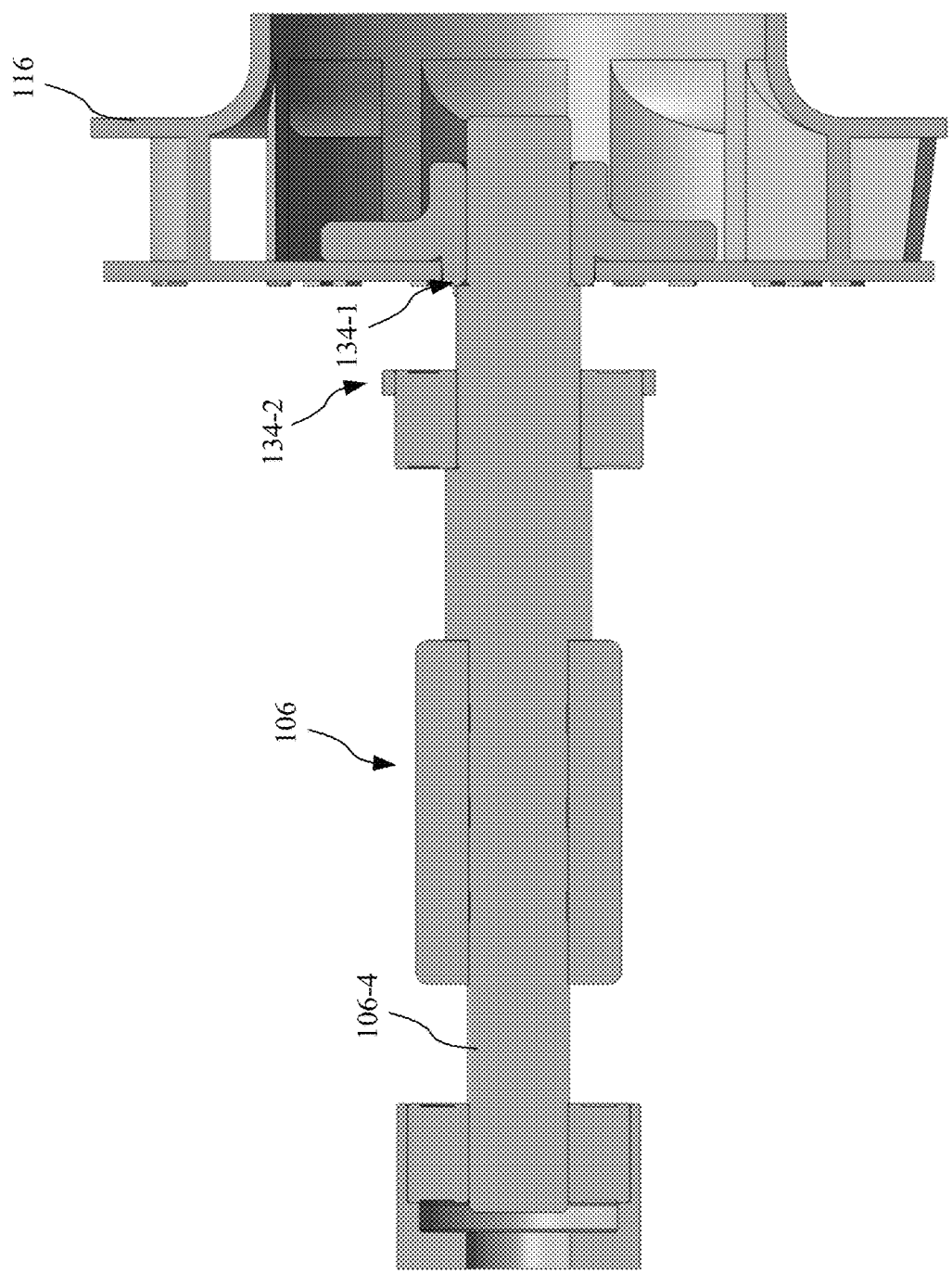
FIG. 7 shows a rotor assembly coupled to, and radially aligned, with an associated fan/impeller based on a step feature of the rotor assembly, in accordance with an embodiment of the present disclosure.

As shown in FIG. 7, the shaft 106-4 of the rotor assembly 106 can include a plurality of step (or shoulder) features including at least first and second step features 134-1, 134-2. The first step feature 134-1 allows for an end of the shaft 106-4 to get inserted into an aperture/through hole of the impeller 116 and "bottom" out against the first step 134-1. Thus, the first step feature 134-1 can operate as a mechanical stop that allows for the fan to achieve the aforementioned perpendicular alignment with the shaft 106-4.

Figure 9:
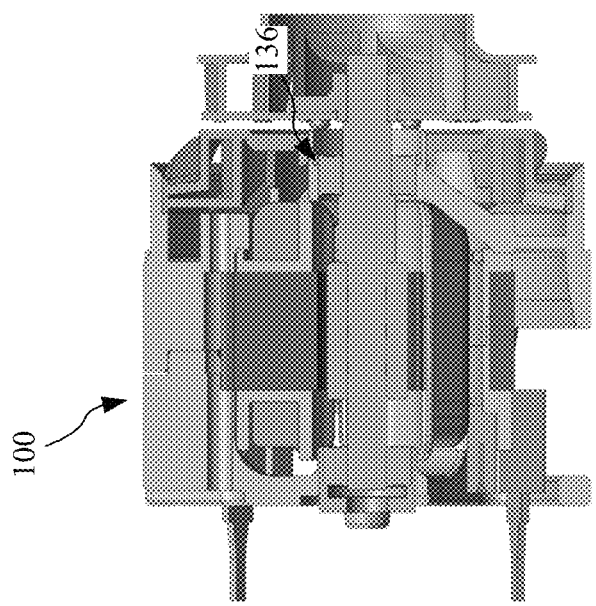
FIG. 9 shows the rotor assembly of FIG. 7 after insertion into a rotor bore of an electric motor, in accordance with an embodiment.
Figure 8:
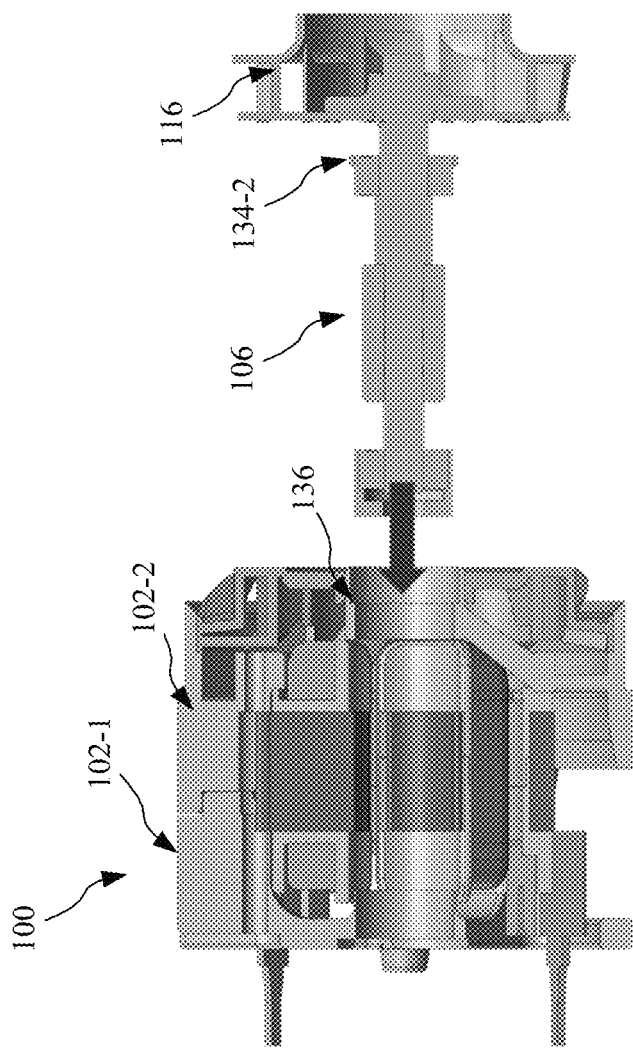
FIG. 8 shows the rotor assembly of FIG. 7 prior to insertion into a rotor bore of an electric motor, in accordance with an embodiment of the present disclosure.

The second step feature 134-2 includes a projection configured to engage a corresponding groove within the motor 100 and prevent further insertion into the bore of the motor 100. For instance, as shown in FIGS. 8 and 9, the rotor assembly 106 gets inserted into the bore of the motor 100. The second step feature 134-2 then engages groove 136 of the second housing portion 102-2, which acts as a mechanical stop to prevent further insertion of the rotor assembly 106. Thus, the second step feature 134-2 of the rotor assembly 106 and the groove 136 of the second housing portion 102-2 ensure that the rotor assembly 106 gets inserted to a predefined position within the bore of the motor 100 by preferably simply bottoming out. Thus, perpendicular alignment of the rotor assembly 106 and insertion to a predefined location within the bore of the motor 100 can be achieved by virtue of the mechanical stops provided by the first and second step features 134-1, 134-2 of the rotor assembly 106.

Figures 10A, 10B:
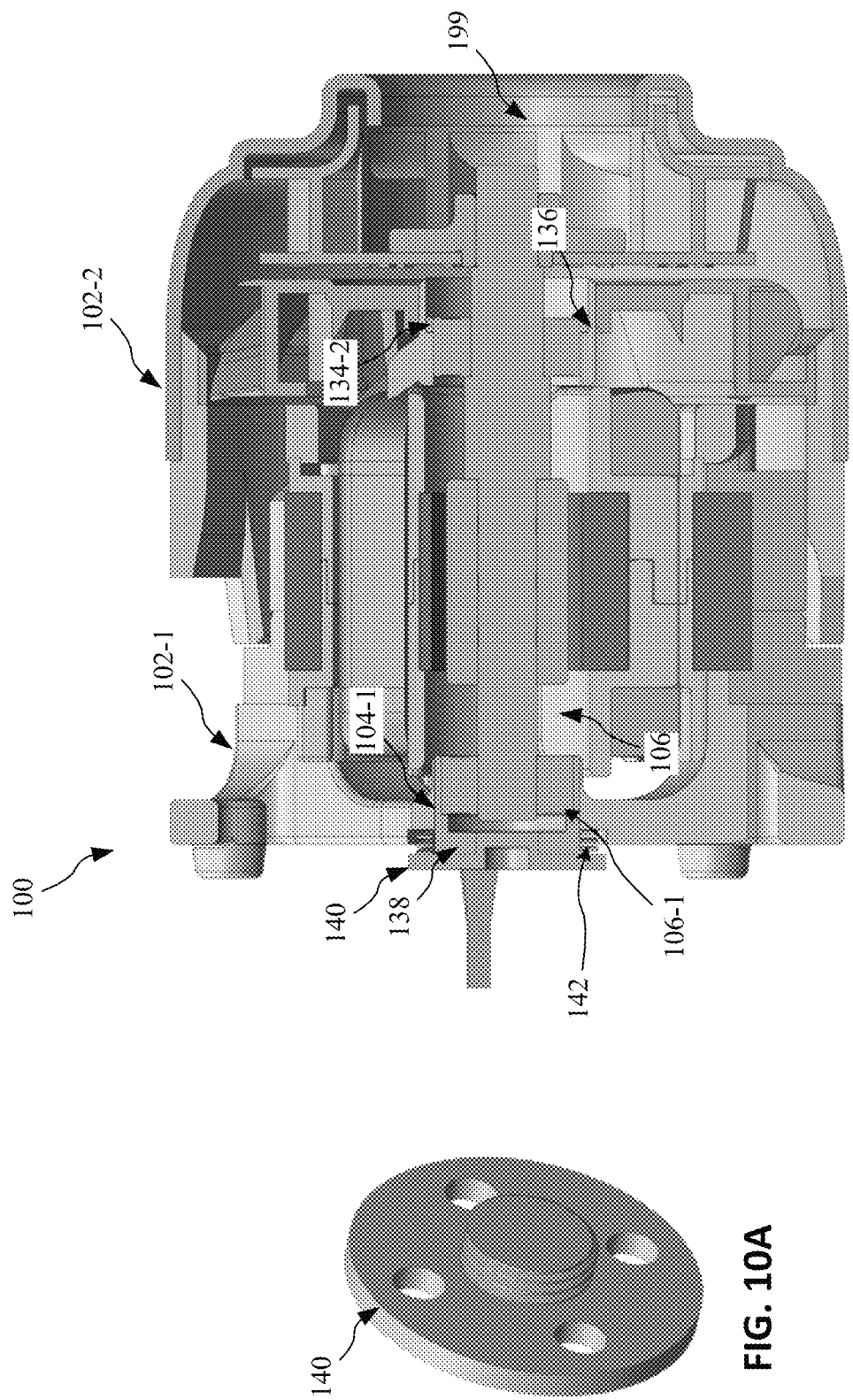
FIG. 10A shows an example lock nut in accordance with an embodiment.
FIG. 10B shows another cross-sectional view of the electric motor of FIG. 1 in accordance with an embodiment.

As shown in FIG. 10B, bearing pre-loading may be achieved via a spring-loaded bearing sleeve consistent with the present disclosure. As shown, the bore of the motor 100, and more particularly, the first bearing receptacle 104-1 is provided at least in part by a bearing sleeve 138. The bearing sleeve 138 includes a diameter to receive at least a portion of the first bearing 106-1 of the rotor assembly 106.

A locking cap 140, such as shown more clearly in FIG. 10A, then couples to the bearing sleeve 138 in a radially and axially aligned orientation, e.g., based on a threaded portion of the locking cap 140 and a corresponding threaded slot of the bearing sleeve 138. The locking cap 140 provides an annular disk that extends substantially transverse relative to the rotor assembly 106 and bore of the motor 100. A spring device 142, such as a wavy washer as shown, gets disposed between the sidewalls of the first housing portion 102-1 and a surface defining the annular disk of the locking cap 140. As further shown, the first housing portion 102-1, and more particularly an outer sidewall thereof, defines a confining recess for receiving and holding the spring device 142 in alignment with the locking cap 140.

The spring device 142 then provides a spring bias force along an axis that extends substantially parallel with the longitudinal axis of the rotor assembly 106 and bore of the motor 100, and along a direction substantially away from the motor 100. This spring bias force thus "pulls" (or draws away) the bearing sleeve 138 to introduce preloading on to the first bearing 106-1.

The bearing sleeve 138 can comprise a material with a thermal expansion coefficient less than that of the material forming the first housing portion 102-1. Thus, expansion of the first housing portion 102-1, e.g., based on heat generated during operation of the motor 100, can occur in a direction substantially parallel with the bore of the motor 100 without causing misalignment of the first bearing 106-1. Instead, the bearing sleeve 138 maintains pressure/force against the first bearing 106-1, which can be generally understood as a force that "pulls" the rotor assembly 106 towards the locking cap 140. However, the rotor assembly 106 remains in radial alignment and fixed within the bore of the motor 100 based on, for example, the second step feature 134-2 that engages groove 136 of the second housing portion 102-2.

Figure 12:
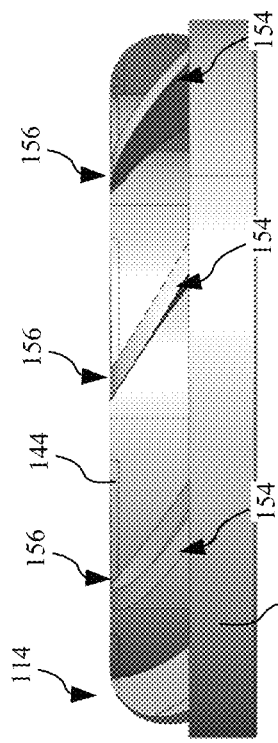
FIG. 12 shows a side view of the diffuser of FIG. 11 in accordance with an embodiment.
Figure 11:
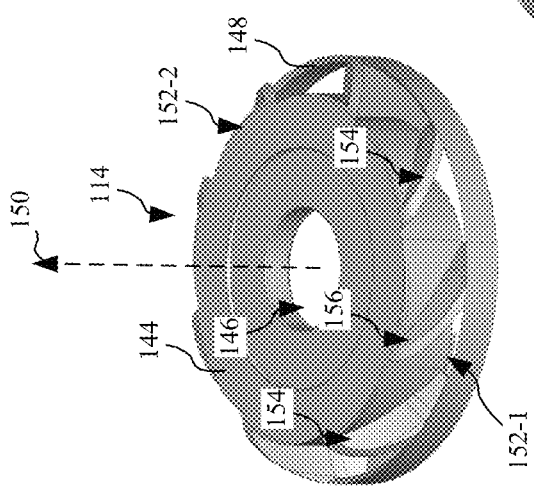
FIG. 11 shows a perspective view of a diffuser suitable for use within an electric motor consistent with the present disclosure.
Figure 13:
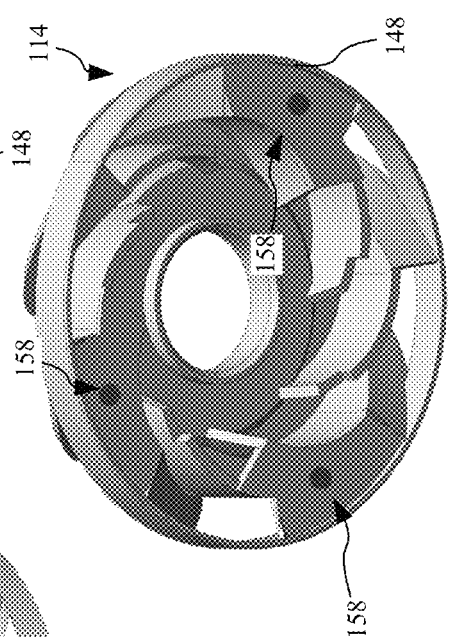
FIG. 13 shows a bottom view of the diffuser of FIG. 11 in accordance with an embodiment.

FIGS. 11-13 show an embodiment of the diffuser 114 of FIG. 3 in isolation. As shown, the diffuser 114 includes a cylindrical body 144 defining an opening/aperture 146 to allow a shaft of the rotor assembly 106 to extend therethrough along the longitudinal axis 150 (See FIGS. 1 and 3). The diffuser 114 further comprises a band 148 (or rim) disposed concentrically with and surrounding the cylindrical body 144. The band 148 includes a side wall that extends substantially parallel with the longitudinal axis 150. The band 148 is disposed adjacent to a first end 152-1 of the cylindrical body 144.

The diffuser 114 further defines a plurality of fins 154 extending radially from the cylindrical body 144. The plurality of fins 154 may also be referred to herein as curved air displacement fins or air displacement fins. Such fins may not necessarily include a curved profile, such as shown in FIGS. 11-13, and can include other shapes and profiles depending on a desired configuration.

Each fin of the plurality of fins 154 adjoins the cylindrical body 144 to the band 148 based on a first portion extending from the first end 152-1 of the cylindrical body 144 along a direction substantially transverse relative to the longitudinal axis 150, and a second portion 156 extending from the band 148 and tapering to a position adjacent the second end 152-2 of the cylindrical body 144. Thus, the band 148 only partially encompasses/surrounds the curved air displacement fins such that a tapered section, e.g., generally shown at 156, of each of the air displacement fins is exposed to air and forms a blade-like (or wing) structure for displacement of air.

As shown in FIG. 13, the plurality of fins 154 further define a plurality of air diverting channels shown generally at 158. As shown in FIG. 13, the diffuser 114 defines at least three of such air diverting channels 158. The air diverting channels 158 are configured generate air jets that extend substantially transverse with the longitudinal axis 150 such that the generated air jets induce cooling across windings 108 and/or the rotor assembly 106 within the motor 100 (See FIGS. 1 and 4). This advantageously introduces cooling for core components within the motor 100 and can increase operational lifespan, limit thermal expansion, and allow for the motor 100 to maintain nominal power over a longer period of time relative to un-cooled motor configurations.

Figure 15:
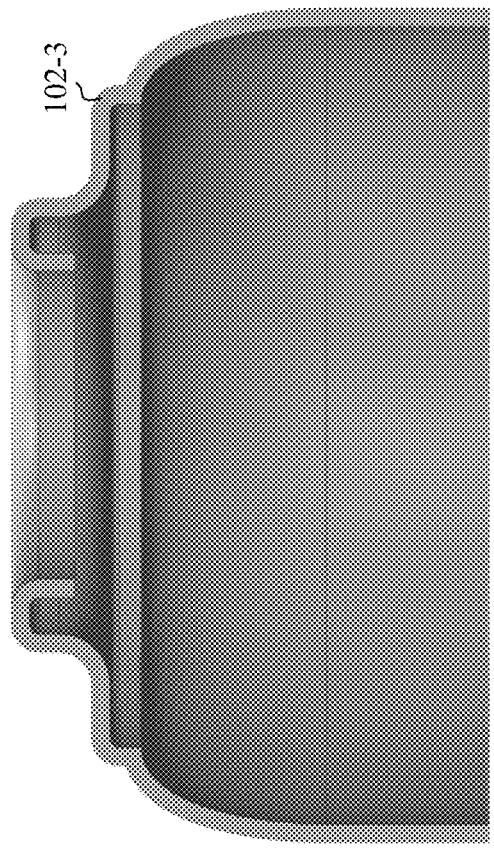
FIG. 15 shows a cross-sectional view of the example shroud of FIG. 14 in accordance with an embodiment.
Figure 14:
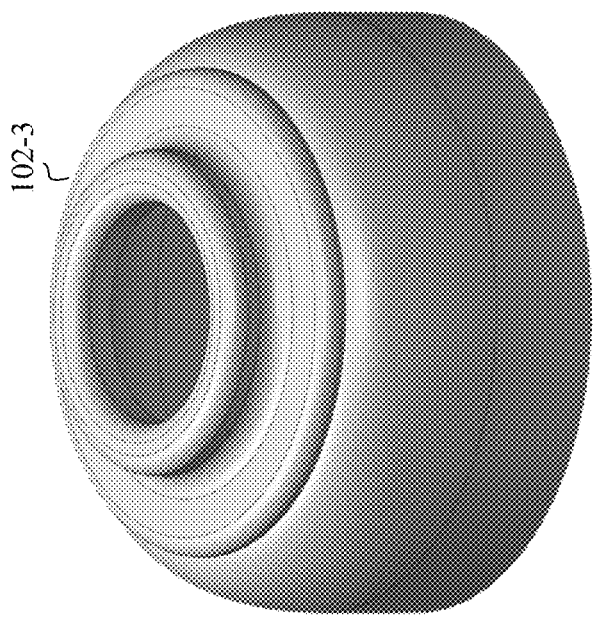
FIG. 14 shows an example shroud for use within an electric motor consistent with the present disclosure.

FIGS. 14-15 show the third housing portion 102-3 of FIG. 3 in isolation. The third housing portion 102-3 may also be referred to as a shroud. As shown, one end of the third housing portion 102-3 defines an aperture 199 for receiving air within the housing 102 (FIG. 10B).

Figure 16:
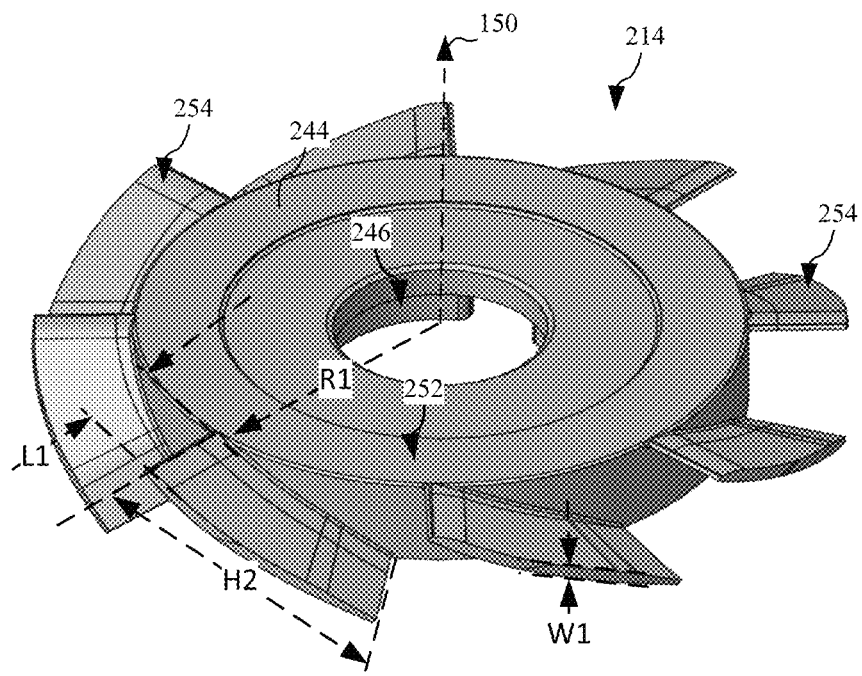
FIG. 16 shows a perspective view of another example diffuser suitable for use within an electric motor consistent with the present disclosure.
Figure 17:
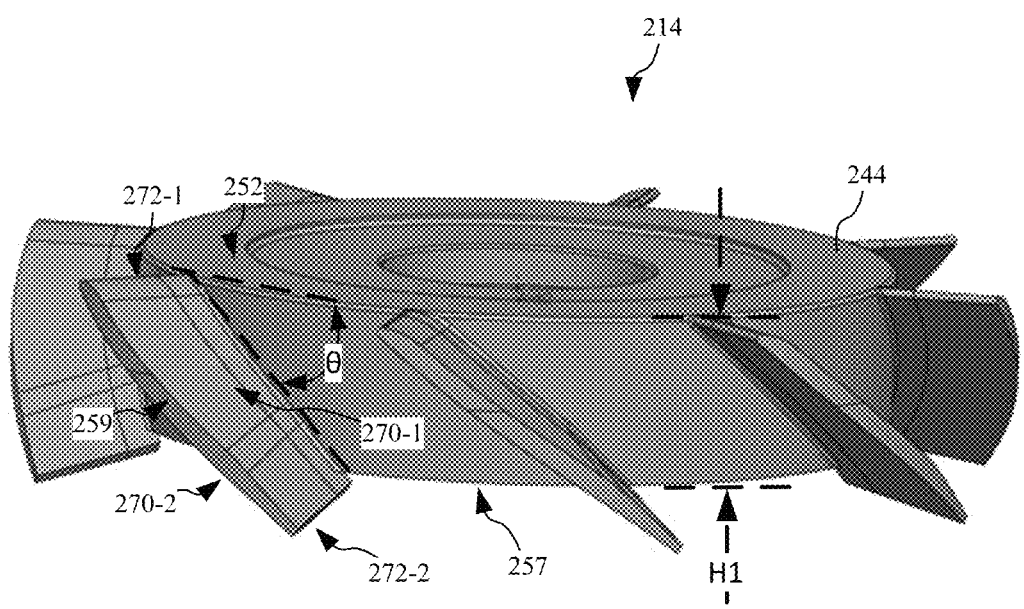
FIG. 17 shows a side view of the diffuser of FIG. 16.
Figure 18:
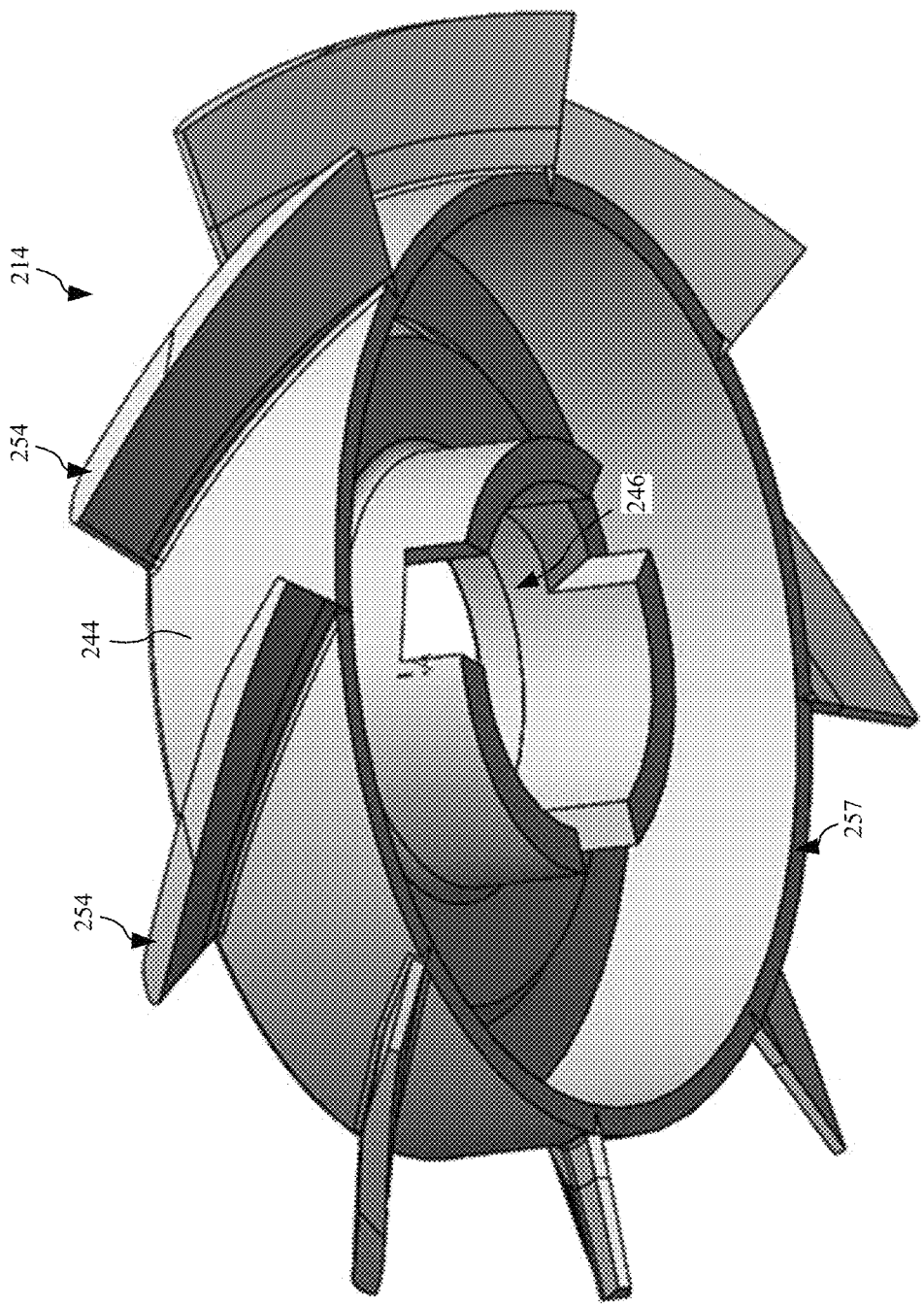
FIG. 18 shows another perspective view of the diffuser of FIG. 16.
Figures 23A, 23B:
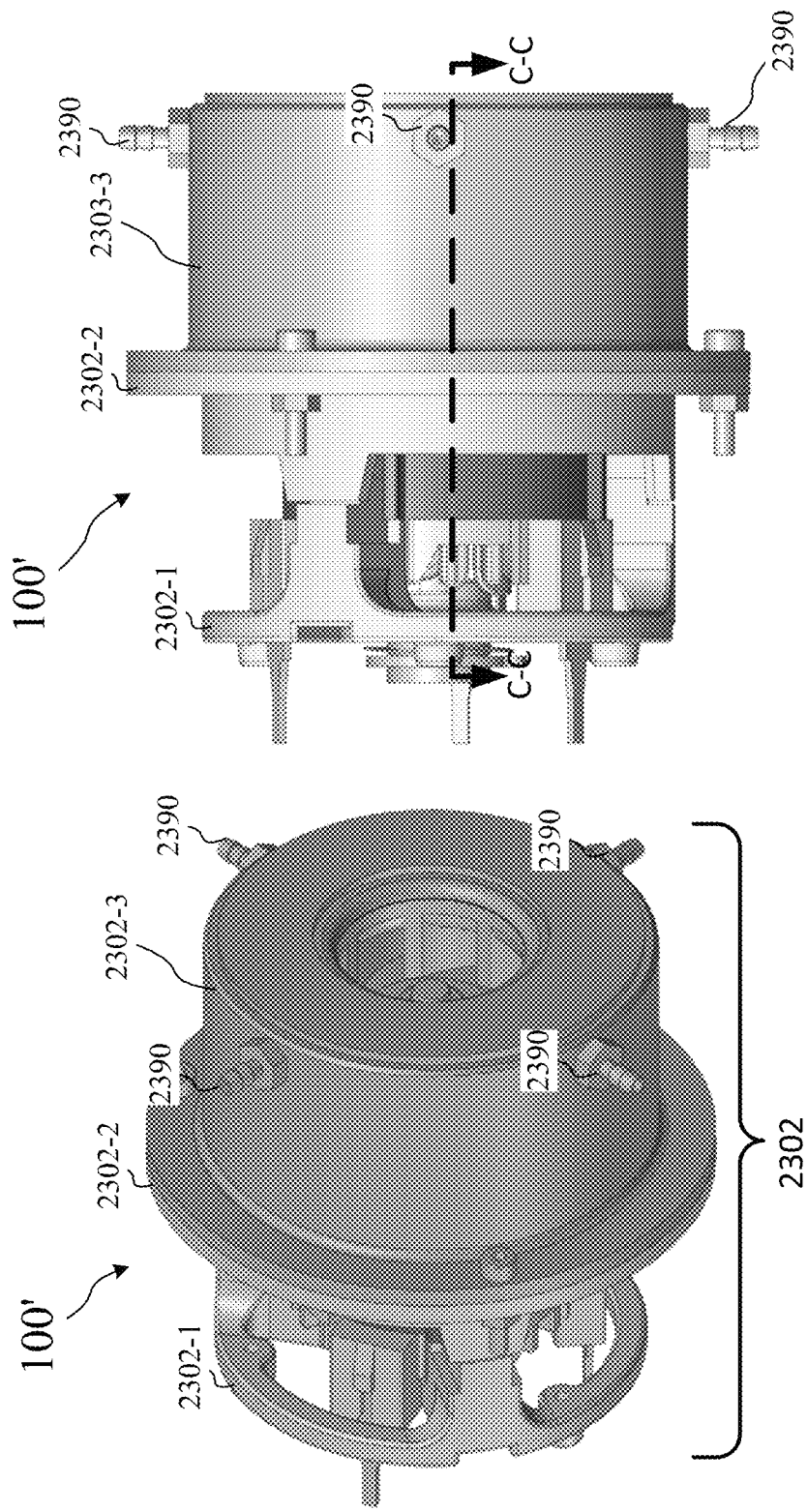
FIG. 23A shows another example electric motor consistent with the present disclosure.
FIG. 23B shows a side view of the electric motor of FIG. 23A.

FIGS. 16-18 collectively show another example embodiment a diffuser 214 suitable for use in the motor 100 of FIGS. 1-4 and/or the motor 100' of FIG. 23A. The diffuser 214 can be configured similar to that of diffuser 114 discussed above to generate air jets within a motor, the description of which will not be repeated for brevity.

However, and as shown in FIGS. 16-18, the diffuser 214 does not include the outer rim/band 148 (See FIG. 11). This disclosure has identified that omitting the rim/band 148 around the diffuser improves aerodynamic performance of the diffuser 214 by reducing the potential for cross-current air flows to form along surfaces of the associated fins, e.g., eddy formations, and the potential for undesirable air recirculation within the housing of a motor, as is discussed in greater detail below.

As shown, the diffuser 214 includes a cylindrical body 244 defining an opening/aperture 246 to allow a shaft of the rotor assembly 106 to extend therethrough along the longitudinal axis 150 (See FIG. 3). The cylindrical body 244 may also be referred to herein as a diffuser body or simply a body.

The diffuser 214 further defines a plurality of fins 254 that extend radially from the cylindrical body 244 such that plurality of fins 254 extend substantially transverse relative to the rotor assembly 106 when the same extends through the opening 246. The plurality of fins 254 can be evenly distributed around the diameter of the cylindrical body 244 and preferably include a uniform distance between each fin. The fins 254 may also be referred to herein as curved air displacement fins or simply curved fins.

Preferably, the plurality of fins 254 are formed with the cylindrical body 244 as single, monolithic piece of material. For example, the cylindrical body 244 and fins 254 may be formed from a single piece of composite and/or thermoset plastic. However, this disclosure is not necessarily limited in this regard and the cylindrical body 244 and fins 254 may be formed as separate pieces comprising the same or different material.

As shown in FIGS. 16 and 17, each fin of the plurality of fins 254 preferably includes a curved profile and extend radially from the cylindrical body 244 to an overall length L1. Preferably, the overall length L1 measures between 4 and 6 mm, and more preferably, at least a distance of 5 mm. In one example configuration, the overall length L1 measures between 10% to 50% of the radius R1 of the cylindrical body 244.

Each fin of the plurality of fins 254 include top and bottom surfaces 270-1, 270-2 that extend from a first end 272-1 to a second end 272-2. The top and bottom surfaces 270-1, 270-2, are disposed opposite each other and extend at a predetermined angle (θ) relative to the top surface 252 defining a first end of the cylindrical body 244 (See FIG. 17). Preferably, the predetermined angle (θ) measures between 25-50 degrees, and more preferably, 30 to 35 degrees.

Each fin of the plurality of fins 254 preferably extend from the first end 272-1 to the second end 272-1 to an overall height of H2. Preferably, the overall height H2 measures between 13 and 16 mm. In one example configuration, the overall height H2 measures equal to or greater than the overall height H1 of the cylindrical body 244. Preferably, the overall height H1 measures between 9 and 10 mm.

As shown in FIG. 17, each fin of the plurality of fins 254 preferably include a first end 272-1 with a distal surface that is substantially flush with the top surface 252 defining the first end of the cylindrical body 244. Each fin of the plurality of fins 254 further preferably includes a second end 272-2 that extends beyond a bottom surface 257 that defines a second end of the cylindrical body 244.

Preferably, the width W1 (FIG. 16) from the first end 272-1 to the second end 272-2 of each fin of the plurality of fins 254 varies to provide a taper at one or both ends. The width W1 of each fin of the plurality of fins 254 can measure between 1 and 2 mm, for example. More preferably, the width of W1 of each fin of the plurality of fins 254 along their respective entire length measures a maximum of 10-25% (0.1 to 0.25) of the overall length L1 each fin extends from the cylindrical body 244. Thus, the ratio of the width W1 of each fin relative to the length L1 can be between 0.2:1.0 and 0.25:1.0, although other ratios are within the scope of this disclosure. Accordingly, each fin of the plurality of fins 254 can provide a blade-like structure to displace air and diffuse the same into a motor during operation.

As discussed above, the diffuser 214 shown in FIGS. 16-18 includes a rimless configuration that does not include rim/band 148 (See FIG. 11). Thus, each fin of the plurality of fins 254 can include a distal portion relative to the cylindrical body 244 that does not couple to an adjoining rim structure. Stated differently, each fin of the plurality of fins 254 preferably couples to the cylindrical body 244 along a region of each fin that is proximate the cylindrical body 244 such that the distal end of each fin relative to the cylindrical body 244 is fully/entirely exposed (e.g., to air). As shown in FIG. 17, this can include the distal end provided by surface 259, which extends substantially transverse relative to the first and second surfaces 270-1, 270-2 and adjoins the same, being (fully) exposed to air.

Thus, air may then flow along the first and/or second surfaces 270-1, 270-2 in a first direction that extends from the first end 272-1 to the second end 272-2 of each fin, and also in a second direction which is transverse to the first direction to allow air to flow radially outwards away from the cylindrical body 244 without being obstructed/impeded by, for instance, surfaces defining the rim 148 (See FIG. 11). This may advantageously increase aerodynamic performance by minimizing or otherwise reducing eddy formations which can reduce the overall amount of air that recirculates/stagnates within the housing of the motor.

Figure 19:
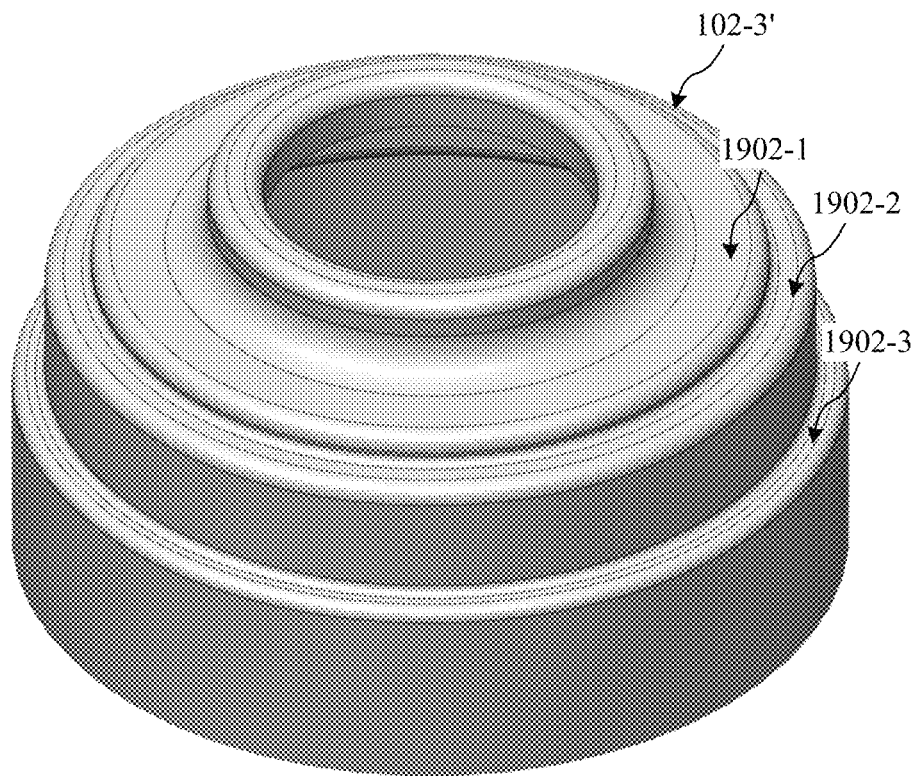
FIG. 19 shows another example shroud for use within an electric motor consistent with the present disclosure.
Figure 20:
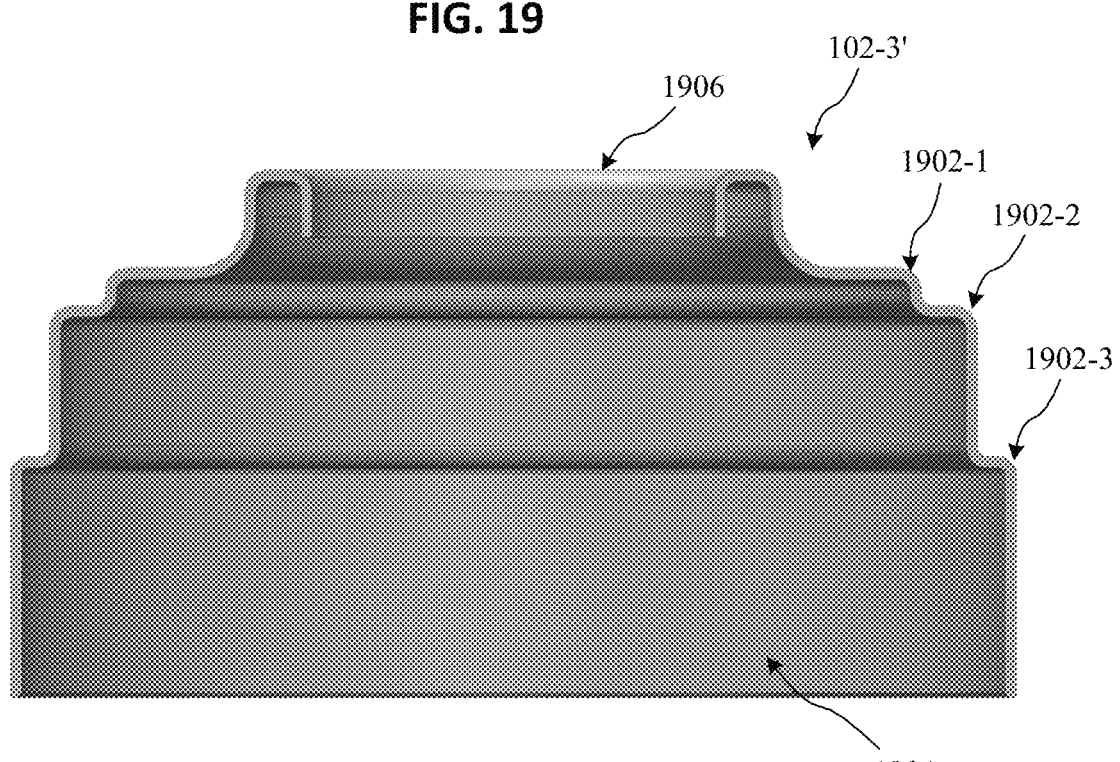
FIG. 20 shows a cross-sectional view of the example shroud of FIG. 19 in accordance with an embodiment.

FIGS. 19-20 shows an example third housing portion 102-3' consistent with aspects of the present disclosure. The third housing portion 102-3' can be utilized with the motor 100 of FIG. 1 and/or motor 100' of FIG. 23A as the third housing portion 102-3/2302-3. The third housing portion 102-3' may also be referred to herein as a shroud.

The third housing portion 102-3' preferably includes a dome-shaped profile that defines an inner cavity 1904. The third housing portion 102-3' can include other shapes/profiles and the example shown in FIGS. 19-20 is not intended to be limiting.

The third housing portion 102-3' further defines an aperture 1906 at an end which is in communication with the inner cavity 1904. Note, the aperture 1906 can provide the aperture 199 (See FIG. 10B) when coupled to a motor. The third housing portion 102-3' further preferably provides a plurality of shoulder/step features shown as first, second and third step features 1902-1, 1902-2, 1902-3 respectively. The particular number of step features shown in FIGS. 19-20 are not intended to be limiting and more or less step features may be utilized depending on a desired configuration.

As discussed in greater detail below, the one or more such step features may be utilized as a mechanical stop to allow for insertion of one or more sealant devices (also referred to herein as seal devices) to block air from entering/exiting a motor 100 via gaps formed between the third housing portion 102-3, rotor assembly 106 and fan/impeller 116.

Figure 22A:
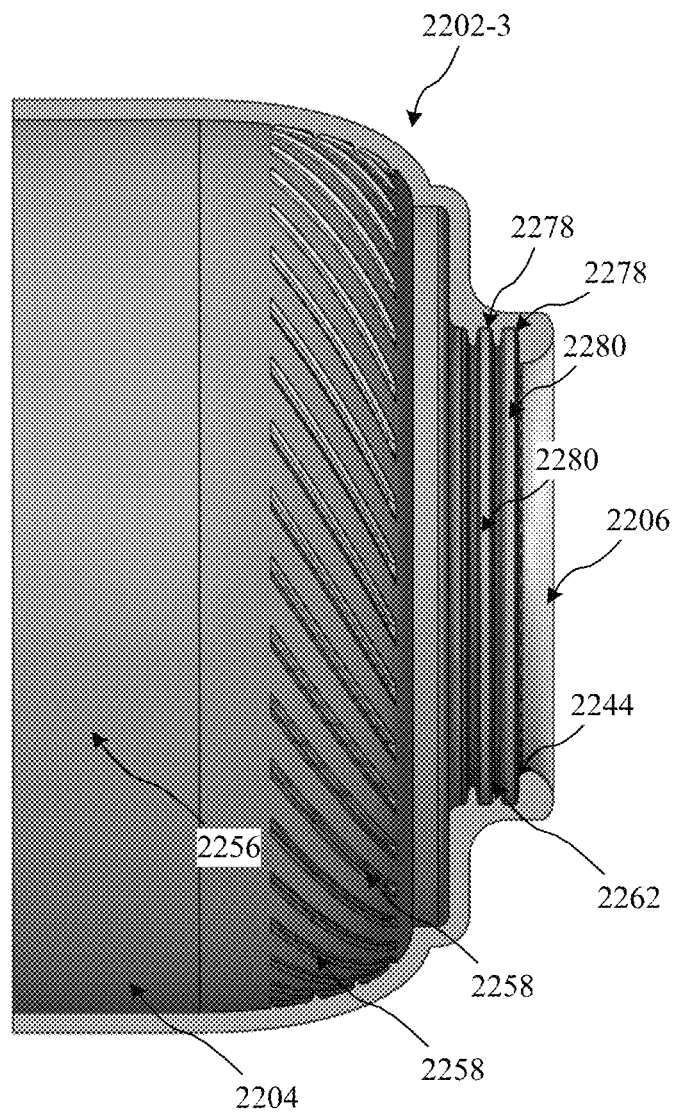
FIG. 22A shows another example shroud for use within an electric motor consistent with the present disclosure.

FIG. 22A shows a cross-sectional view of an example third housing portion 2202-3 that includes a cavity 2204 defined by inner sidewall 2256. The cavity 2204 may at least partially define an impeller windage chamber when the third housing portion 2202-3 is coupled to a motor. The example third housing portion 2202-3 may be utilized within the motor 100 and/or motor 100' of FIGS. 1 and 23A, for example.

As further shown, the inner sidewall 2256 defines a plurality of riblets/projections 2258 that extend into the cavity 2204. Each of the riblets/projections of the plurality of riblets 2258 extend substantially parallel relative to each other and form a spiral pattern preferably along the entire inner diameter of the cavity 2204.

The plurality of riblets 2258 are preferably angled to guide air along a direction that extends substantially parallel with the longitudinal axis of the motor, e.g., longitudinal axis 150 of motor 100 (See FIG. 4), when the third housing portion 2102-3 is coupled to the same. Thus, the plurality of riblets 2258 can also define at least a portion of an impeller compression chamber within the motor 100. The plurality of riblets 2258 can be formed of the same material as the third housing portion 2202-3, such as ABS plastic, or from a different material such as Polyphenylene sulfide (PPS) or steel.

Figure 22B:
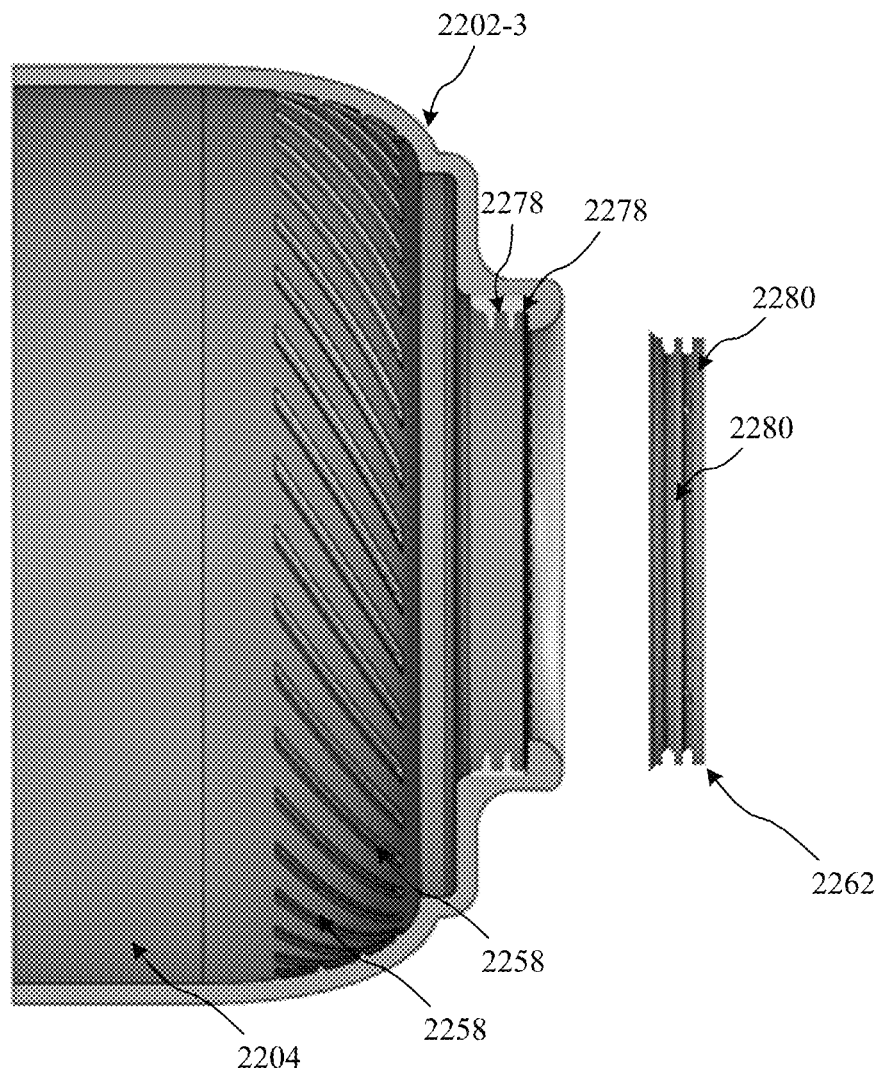
FIG. 22B shows a cross-section of the shroud of FIG. 22A in accordance with an embodiment.

As further shown in FIG. 22A and the partially-exploded view of FIG. 22B, the third housing portion 2202-3 can include a first seal insert 2262. The first seal insert 2262 is preferably formed of a deformable material such as a foam material, although other materials for the first seal insert 2262 are within the scope of this disclosure such as rubber. For example, the first seal insert 2262 may comprise Polytetrafluoroethylene, rubber, and/or nylon.

Figure 21:
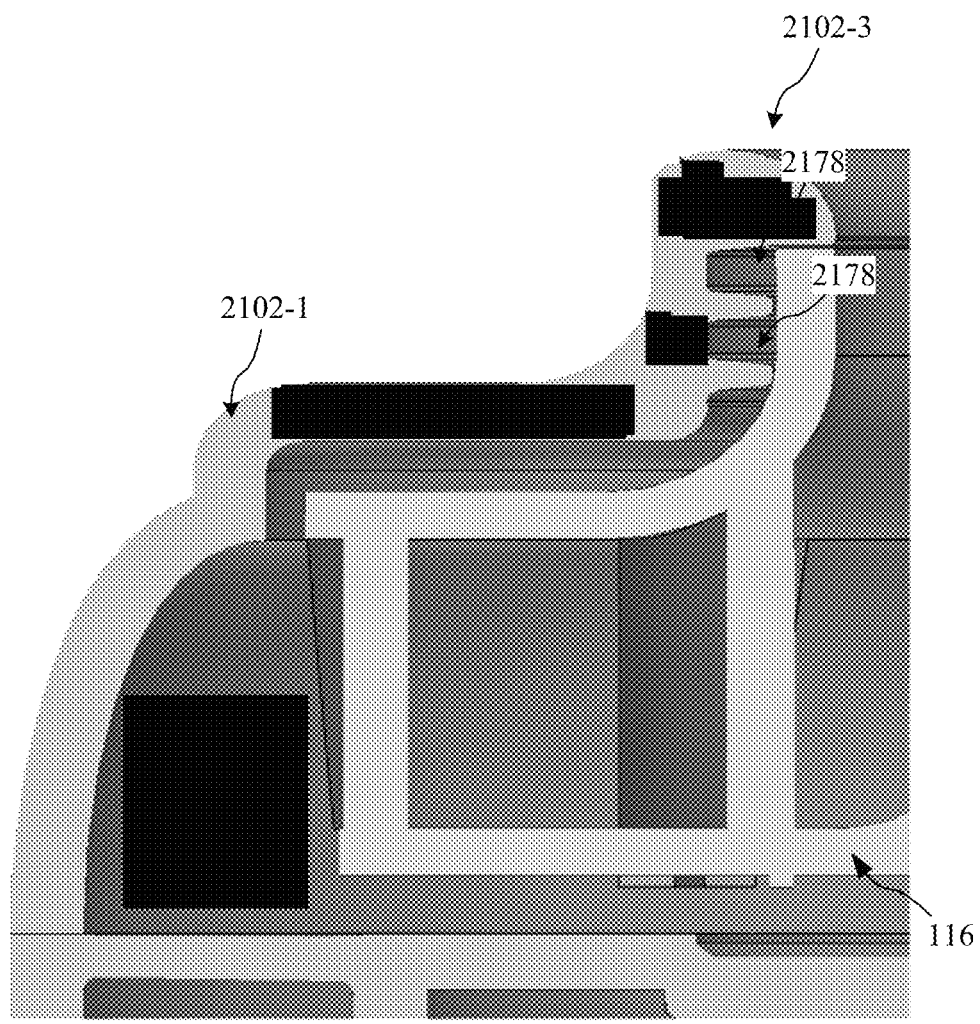
FIG. 21 shows a cross-sectional view of the electric motor of FIG. 1 in accordance with an embodiment.

The first seal insert 2262 preferably includes a plurality of annular rings/projections 2280 that extend radially from a body. The projections 2280 may also be referred to herein as O-rings. Preferably, the plurality of annular rings 2280 are configured to extend into corresponding grooves 2278 defined by the third housing portion 2202-3 such as shown in FIG. 22A. One example of such grooves is shown more clearly as grooves 2178 in the cross-sectional view of FIG. 21.

Figure 22C:
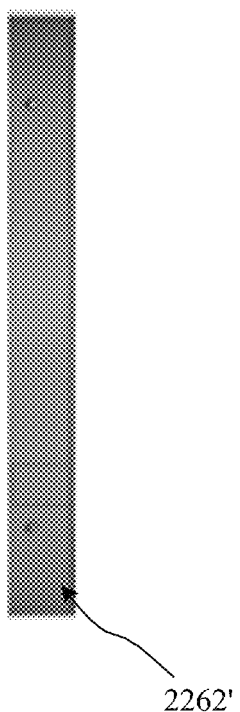
FIG. 22C shows a seal insert device suitable for use in the shroud of FIG. 22A, in accordance with an embodiment.

Alternatively, the first seal insert 2262 may be implemented as a ring that does not necessarily include annular rings/projections 2280. For example, and as shown in FIG. 22C, the first seal insert 2262' can include a substantially smooth outer surface. The first seal insert 2262' may be utilized when, for instance, the third housing portion 2202-3 does not include the grooves 2278.

In any event, the first seal insert 2262' may then advantageously provide an axial seal 2244 at a distal end/lip of the third housing portion 2202-3 (See FIG. 22A) adjacent the surfaces defining aperture 2206, and/or a radial seal based on the annular projections 2280 (See FIG. 22B), for example.

Referring to FIGS. 23A-23B another example motor 100' is shown in accordance with aspects of the present disclosure. The motor 100' may be configured substantially similar to that of motor 100, the teachings of which are equally applicable and will not be repeated for brevity. Notably, the motor 100' can also include sub-micron radial alignment for the associated rotor assembly utilizing, for instance, the extendable mandrel 124 as discussed above.

However, and as shown, the motor 100' includes a housing shown collectively as 2302 and individually as first, second and third housing portions 2302-1, 2302-2, 2302-3 respectively that include one or more pressure regulator valves 2390.

Figure 23C:
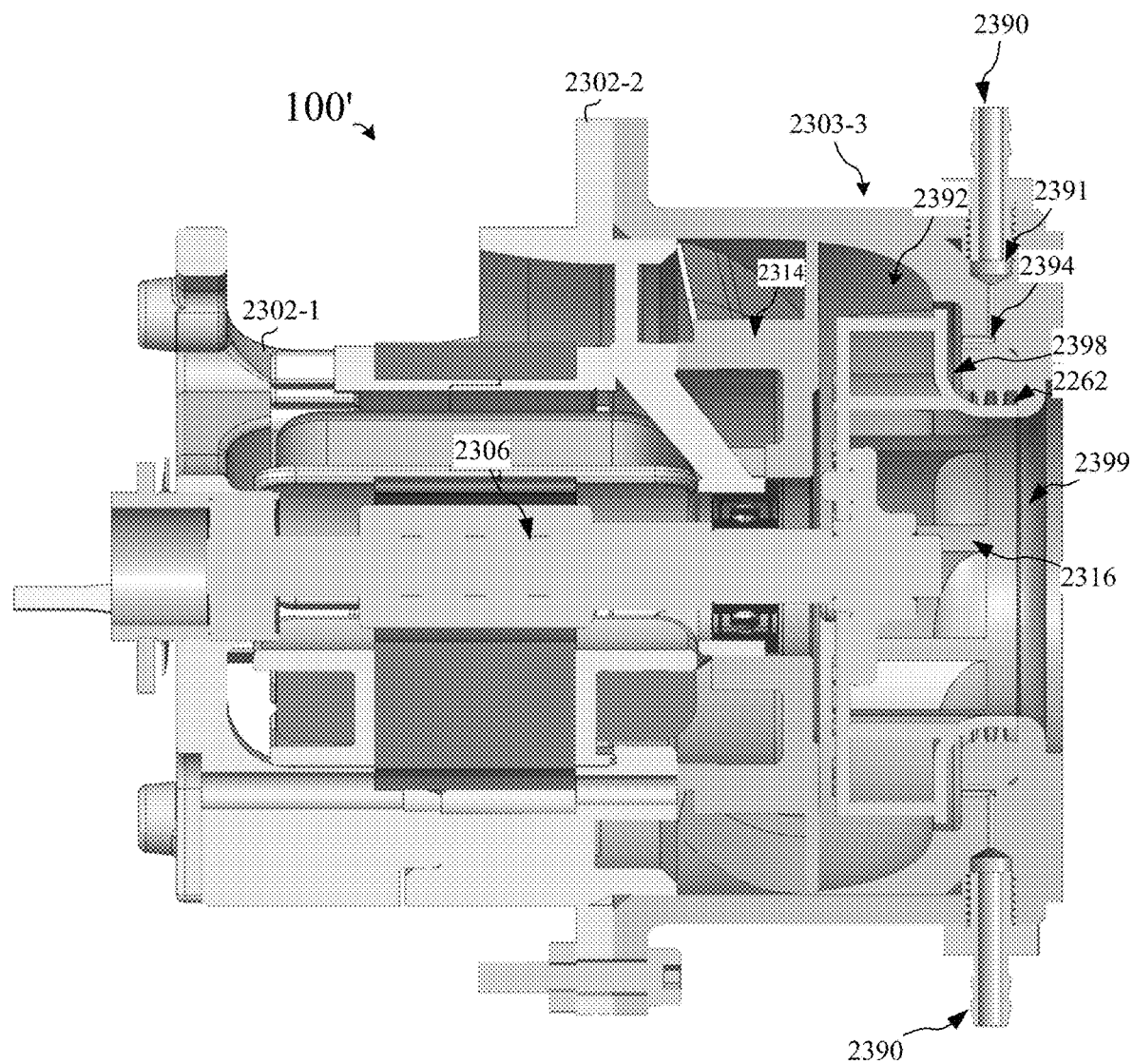
FIG. 23C shows a cross-sectional view of the electric motor of FIG. 23B taken along the line C-C, in accordance with an embodiment of the present disclosure.

Preferably, the one or more pressure regulator valves 2390 are disposed along the third housing portion 2302-3, and more preferably, at a location of the third housing portion 2302-3 that is proximate to the impeller windage/compression chamber 2392 (See FIG. 23C).

Each pressure regulator valve of the one or more pressure regulator valves 2390 can include a nozzle that extends away from the third housing portion 2302-3. Preferably, each nozzle extends radially from the third housing portion 2303-3, such as shown in FIGS. 23A-23C. Each nozzle can include a barbed profile as shown to allow for a friction fit with associated hosing/tubes, although other nozzle profiles are within the scope of this disclosure.

FIG. 23C shows a cross-sectional view of the motor 100' taken along line C-C of FIG. 23B, in accordance with an embodiment of the present disclosure.

As shown, each valve of the one or more pressure regulator valves 2390 includes a first end that extends from the third housing portion 2303-3 and that defines an inlet. The inlet fluidly communicates with valve actuator 2391. The valve actuator 2391 selectively fluidly couples passageway 2394 with the inlet based on, for instance, the air pressure within the passageway 2394 falling below a predetermined threshold value. The predetermined threshold value may be selected to maintain a pressure within the impeller windage chamber 2392 at a target pressure. For example, the target pressure may be about atmospheric +−10 PSI, and the valve actuator 2391 may therefore be configured to open based on air pressure within the passageway 2394 falling below a first predetermined pressure value of −15 PSI, for example.

Notably, the passageway 2394 being disposed at a distal end of the motor 100' (e.g., adjacent the aperture 2399) allows for a pressure differential to be introduced along shoulder 2398 of the impeller 2316 relative to the impeller windage chamber 2392. The valve actuator 2391 may therefore be configured to induce the pressure differential along the shoulder 2398 such that the air pressure proximate the same is greater than the air pressure within the impeller windage chamber 2392. One such example differential includes the air pressure proximate the shoulder 2398 of the impeller 2316 being at least 0.1-0.2% greater than the air pressure within the impeller windage chamber 2392.

Preferably, a first seal insert 2262 provides an airtight seal, e.g., with surfaces defining the impeller 2316, and prevents the communication of air from outside of the motor 100' from entering into the shoulder 2398 of the impeller 2316. Accordingly, air may be then substantially prevented from recirculating along the shoulder 2398 of the impeller 2316 and instead directed over the components of the motor 100' within the housing 2302 (See FIG. 23A).

As further shown in FIG. 23C, the diffuser 2314 can include the rim-less configuration as discussed above with regard to FIGS. 16 and 17. This may further increase air flow through the motor 100' and minimize or otherwise reduce air recirculation. Accordingly, the motor 100' may then achieve a greater overall efficiency based on increased air flow by removing heat generated at the stator assembly within the motor 100'.

In accordance with an aspect a method for aligning sections of an electric motor during manufacturing is disclosed. The method comprising coupling a stator assembly between first and second housing portions to collectively provide a rotor bore extending therethrough, inserting an extendable mandrel into the rotor bore, the extendable mandrel having a retracted position and an extended position, the retracted position to provide the extendable mandrel with an outer diameter substantially equal to or less than a diameter for the rotor bore to allow insertion therein, transitioning the extendable mandrel to the extended position to radially displace the first housing portion, second housing portion, and the stator assembly relative to each other such that the rotor bore extending therethrough has an end-to-end axial offset deviation of less than 50 microns and more preferably less than 10 microns, and securing the first and second housing portions to each other subsequent to transitioning the extendable mandrel to the extended position within the rotor bore such that the rotor bore maintains the end-to-end axial offset deviation after the extendable mandrel gets removed from the rotor bore.

The method can further include inserting the extendable mandrel into the rotor bore further includes inserting the extendable mandrel to a predefined position within the rotor bore. Inserting the extendable mandrel to the predefined position can further include bottoming-out a flange of the extendable mandrel against an outer sidewall of the first or second housing portion.

In the method, inserting the extendable mandrel to the predefined position can further comprise aligning extendable members of the extendable mandrel with each of the first housing portion, the stator assembly, and the second housing portion. In the method, transitioning the extendable mandrel to the extended position preferably causes axial displacement of the first housing portion, the stator assembly, and the second housing portion based on the aligned plurality of extendable members. In the method, securing the first and second housing portions to each other can further comprise disposing an adhesive on an interface between the first and second housing portions. In the method, securing the first and second housing portions to each other can further comprise inserting a screw therebetween.

In accordance with another aspect of the present disclosure an electric motor is disclosed. The electric motor comprising a first housing portion defining a first rotor receptacle to receive and couple to a first end of a rotor assembly, a second housing portion defining a second rotor receptacle to receive and couple to a second end of the rotor assembly, the first and second housing portions configured to couple together and collectively provide a rotor bore to receive the rotor assembly, and a rotor assembly disposed within the rotor bore, the rotor assembly comprising a shaft and first and second bearings coupled concentrically along the shaft, the first bearing being disposed within the rotor receptacle of the first housing portion and the second bearing being disposed within the rotor receptacle of the second housing portion.

The electric motor can further include a sleeve disposed in the first rotor receptacle, the sleeve defining an aperture to receive at least a portion of the first bearing, a locking cap radially aligned and coupled with the sleeve, the locking cap providing an annular disk extending substantially transverse relative to the rotor assembly, and a spring disposed between the first housing portion and annular disk to provide a spring force in a direction substantially parallel to the rotor assembly and away from the first housing portion, the spring force to preload the first bearing.

In the electric motor, the first housing portion can comprise a first material having a first thermal expansion coefficient and the sleeve can comprise a second material having a second thermal expansion coefficient, the second thermal expansion coefficient being less than the first. In the electric motor, the second housing portion can include a groove adjacent the rotor bore, the groove to engage a step feature of the rotor assembly and prevent further insertion of the same. In the electric motor, the spring can comprise a spring washer, and wherein the spring washer is preferably disposed in a confining recess defined by an outer sidewall of the first housing portion.

In accordance with an aspect of the present disclosure an electric motor is disclosed. The electric motor comprising a first housing portion defining a first rotor receptacle to receive and couple to a first end of a rotor assembly, a second housing portion defining a second rotor receptacle to receive and couple to a second end of the rotor assembly, the first and second housing portions configured to couple together and collectively provide a rotor bore to receive the rotor assembly, and a rotor assembly disposed within the rotor bore, the rotor assembly comprising a shaft and at least a first bearing coupled concentrically along the shaft, the first bearing being disposed within the first rotor receptacle of the first housing portion or within the second rotor receptacle of the second housing portion, and wherein the shaft and first bearing are radially aligned with each other based on the rotor bore collectively provided by the first and second housing portions having an end-to-end offset deviation of less than 10 microns.

In accordance with another aspect of the present disclosure a rotor bore alignment device for radial alignment of a bore collectively provided by a plurality of housing portions of an electric motor is disclosed. The rotor bore alignment device comprising a shaft, the shaft having at least one extendable member disposed at a predefined location along the shaft, the at least one extendable member to selectively transition from a retracted orientation to an extended orientation, the retracted orientation causing the at least one extendable member to radially extend from the shaft to a first distance D1, and the extended orientation causing the at least one extendable member to radially extend from the shaft to a second distance D2, the second distance D2 being greater than the first distance D1, and wherein the shaft is configured to slidably couple into the bore to a predefined position, the predefined position to align the at least one extendable member with at least a first motor component of the electric motor such that transitioning of the at least one extendable member to the extended orientation causes radial alignment of the first motor component with a second motor component of the electric motor.

In accordance with an aspect of the present disclosure a diffuser for use with an electric motor is disclosed. The diffuser comprising a cylindrical body defining an opening to allow a shaft of a rotor assembly to extend therethrough, and a plurality of curved air displacement fins extending radially from the cylindrical body.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an electric motor may embody any one or more of the features contained herein and that the features may be used in any particular combination or sub-combination. Modifications and substitutions by one of ordinary skill in the art are considered to be within the scope of the present disclosure, which is not to be limited except by the claims.

What is claimed is:

1. A diffuser for use with an electric motor, the diffuser comprising:
   a cylindrical body having a first end, a second end, and defining an opening extending from the first end to the second end to allow a rotor shaft of a rotor assembly of the electric motor to extend therethrough;
   a rim disposed concentrically with and surrounding the cylindrical body;
   a plurality of fins adjoining the cylindrical body to the rim, each of the plurality of fins having a first portion extending from the first end of the cylindrical body along a direction transverse to a longitudinal axis of the opening, and each of the plurality of fins having a second portion extending from the rim and tapering to a position adjacent the second end of the cylindrical body,
   the rim having a height measured in the direction of the longitudinal axis that is less than the distance from the first end to the second end of the cylindrical body, whereby the rim only partially encompasses the plurality of fins such that the second portion of each of the plurality of fins is exposed to air.

2. The diffuser of claim 1, wherein each of the plurality of fins defines an associated air diverting channel configured to generate an associated air jet extending transverse to the longitudinal axis of the opening.

3. The diffuser of claim 1, wherein the cylindrical body and the plurality of fins are defined by a single piece of material.

4. A diffuser for use with an electric motor, the diffuser comprising:
   a cylindrical body having a top surface defining a first end of the cylindrical body, a bottom surface defining a second end of the cylindrical body, the bottom surface located closer to the electric motor than the top surface, and defining an opening extending from the top surface to the bottom surface to allow a rotor shaft of a rotor assembly of the electric motor to extend therethrough; and
   a plurality of fins extending radially from a side surface of the body and transverse to a longitudinal axis of the opening,
   each one of the plurality of fins extending radially from the body to an overall length defined from the side surface of the body to a distal end the one of the plurality of fins, the overall length being between 10% and 50% of a radius of the body,
   each one of the plurality of fins having a fin top surface and a fin bottom surface extending from a first end to a second end of the one of the plurality of fins, wherein the fin top surface is disposed at an angle between 25 and 50 degrees relative to the top surface of the body,
   each one of the plurality of fins having an overall height defined from the first end to the second end of the one of the plurality of fins, wherein the overall height is greater than a height of the body defined from the top surface to the bottom surface of the body, and
   the first end of each one of the plurality of fins having a distal surface flush with the top surface of the body, whereby each one of the plurality of fins does not extend above the top surface of the body, and the second end of each one of the plurality of fins extending beyond the bottom surface of the body.

5. The diffuser of claim 4, wherein each one of the plurality of fins has a width defined from the fin top surface to the fin bottom surface, wherein the width varies to provide a taper at one or both of the first and second ends.

6. The diffuser of claim 4, wherein each one of the plurality of fins has a width defined from the fin top surface to the fin bottom surface, and wherein a maximum of the width is between 10% and 25% of the overall length.

7. An electric motor comprising:
   a first housing portion;
   a second housing portion coupled to the first housing portion to define a stator cavity between the first housing portion and the second housing portion;
   a stator assembly disposed in the stator cavity;
   a rotor assembly comprising a rotor shaft extending through the stator assembly and supported on a first side by the first housing portion and on a second side by the second housing portion;
   a fan coupled to the rotor shaft; and
   a diffuser disposed between the second housing portion and the fan, the diffuser comprising
      a cylindrical body having a first end, a second end, and defining an opening extending from the first end to the second end, the rotor shaft extending through the opening;
      a rim disposed concentrically with and surrounding the cylindrical body;
      a plurality of fins adjoining the cylindrical body to the rim, each of the plurality of fins having a first portion extending from the first end of the cylindrical body along a direction transverse to a longitudinal axis of the opening, and each of the plurality of fins having a second portion extending from the rim and tapering to a position adjacent the second end of the cylindrical body,
      the rim having a height measured in the direction of the longitudinal axis that is less than the distance from the first end to the second end of the cylindrical body, whereby the rim only partially encompasses the plurality of fins such that the second portion of each of the plurality of fins is exposed to air.

8. The electric motor of claim 7, further comprising a third housing portion coupled to the second housing portion, the third housing portion defining an aperture to communicate air into the electric motor.

9. The electric motor of claim 8, wherein the third housing portion defines at least in part a fan windage chamber and the fan is disposed within the fan windage chamber, the motor further comprising at least one pressure regulator valve in fluid communication with the fan windage chamber.

10. The electric motor of claim 9, further comprising a seal between the aperture and the fan.

11. The electric motor of claim 7, wherein each of the plurality of fins defines an associated air diverting channel configured to generate an associated air jet extending transverse to the longitudinal axis of the opening.

* * * * *